(12) United States Patent
Danielson et al.

(10) Patent No.: US 7,257,566 B2
(45) Date of Patent: Aug. 14, 2007

(54) METHOD FOR DECISION AND RISK ANALYSIS IN PROBABILISTIC AND MULTIPLE CRITERIA SITUATIONS

(76) Inventors: Mats Danielson, Gronviksvagen 89, Bromma (SE) 167 71; Love Ekenberg, Svanekegrand 1, Kista (SE) 164 46

( * ) Notice: Subject to any disclaimer, the term of this patent is extended or adjusted under 35 U.S.C. 154(b) by 0 days.

(21) Appl. No.: 11/145,229

(22) Filed: Jun. 6, 2005

(65) Prior Publication Data

US 2006/0004682 A1 Jan. 5, 2006

(51) Int. Cl.
*G06N 5/04* (2006.01)
(52) U.S. Cl. .............. 706/52; 706/17; 706/21; 706/45; 706/47; 706/53; 705/10; 705/12; 705/35; 705/414
(58) Field of Classification Search ............ 706/15–21, 706/45, 47, 52, 53, 55; 705/10, 12, 17, 35, 705/36 R, 414
See application file for complete search history.

(56) References Cited

U.S. PATENT DOCUMENTS

| | | | |
|---|---|---|---|
| 5,724,262 A * | 3/1998 | Ghahramani | 702/186 |
| 6,535,865 B1 * | 3/2003 | Skaaning et al. | 706/52 |
| 6,564,197 B2 * | 5/2003 | Sahami et al. | 706/55 |
| 6,631,362 B1 * | 10/2003 | Ullman et al. | 706/60 |
| 7,107,224 B1 * | 9/2006 | Weller et al. | 705/10 |

OTHER PUBLICATIONS

Mats Danielson and Love Ekenberg; "A Framework for Analyzing Decisions Under Risk;" European Journal of Operational Research, vol. 104; 1998; pp. 474-484.

Danielson et al.; "The DecideIT Decision Tool;" Proceedings of ISIPTA '03.

Danielson et al., "Investment Decision Analysis-A Case Study at SCA Transforest;" Proceedings of IKE-2003, vol. 1; pp. 79-85.

Love Ekenberg; "Risk Constraints in Agent Based Decisions;" A. Kent and J. G. Williams (eds.); Encyclopedia of Computer Science and Technology; vol. 23, No. 48; Marcel Dekker Inc.; 2000; pp. 263-280.

Love Ekenberg and Johan Thorbiörnson; "Second-Order Decision Analysis" International Journal of Uncertainty, Fuzziness and Knowledge-Based Systems; vol. 9, No. 1; 2001; pp. 13-37.

Ekenberg et al.; "Simulation and Analysis of Three Flood Management Strategies;" IIASA Interim Report; IR-03-003; 2003.

Peter Gärdenfors and Nils-Eric Sahlin; "Unreliable Probabilities, Risk Taking, and Decision Making;" reprinted from Synthese; vol. 53; 1982; pp. 361-386.

(Continued)

*Primary Examiner*—Joseph P Hirl
*Assistant Examiner*—Omar F Fernández Rivas
(74) *Attorney, Agent, or Firm*—Nixon & Vanderhye P.C.

(57) ABSTRACT

A computer-implemented decision device and a family of methods and procedures are used for representing and analyzing imprecise, vague, and incomplete probabilistic decision and risk problems and/or when a criteria hierarchy is present. Decision makers can state the problems simply with the precision the decision-makers feel they have evidence for. Probabilities, values (utilities), criteria weights with belief distributions over them, and optimization procedures for fast evaluation of decision rules with respect to such statements are determined and analyzed.

31 Claims, 7 Drawing Sheets

OTHER PUBLICATIONS

J. L. Hodges, Jr. and E. L. Lehmann; "The Use of Previous Experience in Reaching Statistical Decisions;" The Annals of Mathematical Statistics; vol. 23, No. 3; Sep. 1952; pp. 396-407.

Kenneth J. Arrow and Leonid Hurwicz; "An Optimality Criterion for Decision-Making Under Ignorance;" Cowles Commission Discussion Paper: Statistics, No. 370; Dec. 1951.

Kyung Sam Park and Soung Hie Kim; "Tools for Interactive Multiattribute Decision Making with Incompletely Identified Information;" European Journal of Operational Research; vol. 98; 1997; pp. 111-123.

Ahti A. Salo and Raimo P. Hämäläinen; "Preference Ratios in Multiattribute Evaluation (PRIME)—Elicitation and Decision Procedures Under Incomplete Information;" IEEE Transactions on Systems, Man, and Cybernetics; vol. 31, No. 6; Nov. 2001; pp. 533-545.

Ahti A. Salo and Raimo P. Hämäläinen; "Preference Programming Through Approximate Ratio Comparisons;" European Journal of Operational Research; vol. 82; No. 3; 1995; pp. 458-475.

Abraham Wald; Statistical Decision Functions; John Wiley & Sons, Inc.; 1950.

Peter Walley; "Statistical Reasoning with Imprecise Probabilities;" Chapman and Hall; 1991.

Kurt Weichselberger and Sigrid Pöhlmann; "A Methodology for Uncertainty in Knowledge-Based Systems;" Springer-Verlag; 1990.

* cited by examiner

METHOD FOR DECISION AND RISK ANALYSIS IN PROBABILISTIC AND MULTIPLE CRITERIA SITUATIONS

FIELD OF THE INVENTION

This invention belongs to decision and risk analysis and more particularly to probabilistic risk and decision analysis as well as decisions under several criteria with incomplete or imprecise information, including software and tools therefore.

BACKGROUND

There are basically two main areas within decision theory: probabilistic decisions and multi-criteria decisions. Each of these contains theories, methods, and procedures for aiding decision makers. A decision maker can be, i.a., one human, a group of humans, a computer program, or a computer software controlled machine. Decision models can be grouped into different types that can be termed Probabilistic Decision models and Multi-Criteria Decision models, see:

M. Danielson and L. Ekenberg, "A Framework for Analyzing Decisions under Risk", *European Journal of Operational Research*, vol.104/3, pp. 474-484, 1998.

M. Danielson, L. Ekenberg, J. Johansson, and A. Larsson, "The DecideIT Tool", Proceedings of ISIPTA 03, 2003a.

M. Danielson, L. Ekenberg, J. Johansson, and A. Larsson, "Investment Decision Analysis: A Case Study at SCA Transforest", Proceedings of IKE-2003, vol.1, pp. 79-85, 2003b.

L. Ekenberg, "Risk Constraints in Agent Based Decisions", in A. Kent and J. G. Williams (eds.), Encyclopaedia of Computer Science and Technology, vol.23:48, pp. 263-280, Marcel Dekker Inc., 2000.

L. Ekenberg and J. Thorbiörnson., "Second-Order Decision Analysis", *International Journal of Uncertainty, Fuzziness and Knowledge Based Systems*, vol.9:1, pp. 13-38, 2001.

L. Ekenberg, L. Brouwers, M. Danielson, K. Hansson, J. Johansson, A. Riabacke and A. Vári, Simulation and analysis of Three Flood Management Strategies, IIASA Interim Report, IR-03-003, 2003.

P. Gärdenfors and N. E. Sahlin, "Unreliable Probabilities, Risk Taking, and Decision Making", *Synthese*, vol.53, pp. 361-386, 1982.

J. L. Hodges and E. L. Lehmann, "The Use of Previous Experience in Reaching Statistical Decisions", *Annals of Mathematical Statistics*, vol.23, pp. 396-407, 1952.

L. Hurwicz, Optimality Criteria for Decision Making under Ignorance, Cowles Commission Discussion Paper no.370, 1951.

K. S. Park and S. H. Kim, "Tools for Interactive Multi-attribute Decision Making with Incompletely Identified Information", *European Journal of Operational Research*, vol.98, pp.111-123, 1997.

A. A. Salo and R. P. Hämäläinen, "Preference Ratios in Multiattribute Evaluation [PRIME]-Elicitation and Decision Procedures under Incomplete Information". *IEEE Transactions on Systems, Man, and Cybernetics*, vol.31/6, pp. 533-545, 2001.

A. A. Salo and R. P. Hämäläinen, "Preference Programming through Approximate Ratio Comparisons", *European Journal of Operational Research*, vol.82, no.3, pp. 458-475, 1995.

P. Walley, Statistical Decision Functions, John Wiley and Sons, 1991.

A. Wald, Statistical Reasoning with Imprecise Probabilities, Chapman and Hall, London, 1950.

K. Weichselberger and S. Pöhlman, A Methodology for Uncertainty in Knowledge-Based Systems, Springer-Verlag, 1990.

Probabilistic Decision models are often given a tree representation. Consider the tree in FIG. 6. The decision tree consists of a root, representing a decision, a set of intermediary (event) nodes, representing some kind of uncertainty and consequence nodes, representing possible final outcomes. Usually probability distributions are assigned as weights in the probability nodes as measures of the uncertainties involved. The informal semantics are simply that given that an alternative $A_i$ is chosen there is a probability $p_{ij}$ that an event $H_{ij}$ occurs. This event can be a consequence with a value $v_{ijk}$ assigned to it or another event. Usually, the maximization of the expected value is used as an evaluation rule. For instance, in FIG. 6, the expected value of alternative $A_i$ is:

$$E(A_i) = \sum_{j=1}^{2} p_{ij} \sum_{k=1}^{2} p_{ijk} v_{ijk1}.$$

There are also several approaches for multi-criteria decision making, where the decision criteria can be arranged in hierarchies. See FIG. 7. Examples include the analytical hierarchy process (AHP), the Evidential Reasoning (ER) approach, and various methods by Salo et al above.

On each level, the criteria are given weights and the alternatives are valued with respect to each sub-criterion. The maximization of the weighted value is usually used as an evaluation rule. For instance, in FIG. 7, the value of alternative $A_i$ under sub-criterion jk is denoted $v_{ijk}$. The weight of criteria j is denoted by $w_j$. Then the weighted value of alternative $A_i$ is:

$$E(A_i) = \sum_{j=1}^{2} w_j \sum_{k=1}^{2} w_{jk} v_{ijk}.$$

Since the expected value is a weighting operation, both of the above approaches, probabilistic decision models and multi-criteria decision models, selects the alternative with the greatest weighted value. However, no combination rules or algorithms for the evaluation of such a combination have been proposed. Note that in this presentation, the concepts "expected value" and "weighted value" are used interchangeably for the expected value in probabilistic models as above, for the weighted value in multi-criteria models as above, and for the combined generalized expected value containing both criteria weights and probabilities as introduced below.

Risk Analysis is the task of determining the risk involved with a particular action, often resulting in a chain of events, each event path through the risk tree ending in a final consequence. Risk analyses are often displayed using a tree representation. The risk tree consists of a set of intermediary (event) nodes, representing some kind of uncertainty and consequence nodes, representing possible final outcomes. The kinship with probabilistic decisions is strong. A risk analysis can be equally regarded as a decision between a main alternative (the risk situation) and a zero alternative with only one final consequence having the value zero. Thus, when referring to decision problems, the methods and software and tools as described herein can equally be applied to risk analysis.

Probabilistic networks contain chains of events dependent on each other, where a prior node is a precondition for the subsequent node in the (directed) path. While not specifically treated in the sequel, the multiplication of probabilities occurring in probabilistic networks is computationally analogous to the evaluation of event chains in decision trees. Furthermore, decisions made in probabilistic networks through conversion into influence diagrams are solved using the same tree methods and procedures presented here. Thus, when referring to decision problems, the methods and software and tools as described herein can equally be applied to other decision models such as probabilistic networks and influence diagrams.

The information available in decision making is often incomplete, vague, and imprecise, and several decision models have been suggested to handle such situations. During the last 50 years, various methods based on interval estimates of probabilities and values of any sort not only numerical values have been suggested. Even if these approaches generally are well-founded, much less has been done to take the evaluation perspective into consideration and, in particular, computational aspects and implementational issues.

A number of models with representations allowing imprecise probability statements have been suggested over the years. Some of them are based on capacities, evidence theory and belief functions, various kinds of logic, upper and lower probabilities, or sets of probability measures. The common characteristic of the approaches is that they typically do not include the additivity axiom of probability theory and consequently do not require a decision maker to model and evaluate a decision situation using precise probability (and, in some cases, value) estimates. For some overviews, see, e.g., [Weichselberger & Pöhlman, 1990], [Walley, 1991], and [Ekenberg & Thorbiörnson, 2001].

These have been more concerned with representation and less with evaluation. Moreover, very few have addressed the problems of computational complexity when solving decision problems involving interval estimates. It is important to be able to determine, in a reasonably short time, how various evaluative principles rank the given options in a decision situation.

Interval approaches have also been considered in order to extend decision models for multi-criteria decision making. The method PRIME in [Salo & Hämäläinen, 2001] is a generalization of value tree analysis. Similarly, the preference programming method [Salo & Hämäläinen, 1995] extends the analytical hierarchy process (AHP). These approaches are limited in several respects with respect to expressibility and evaluation capabilities. Neither do they address probabilities or consequence structures. [Park & Kim, 1997] is an attempt to combine criteria weights with probabilistic reasoning, treating only one-level criteria, and can only rank the options without cardinal aspects. A one-level representation in this manner, but with larger expressibility compared to [Park & Kim, 1997], is provided in [Danielson et al, 2003a] and [Ekenberg et al, 2003].

Further, some approaches for extending the representation using distributions over classes of probability and utility measures have been proposed. These have been developed into various hierarchical models, such as second-order probability theory [Gärdenfors & Sahlin, 1982], [Ekenberg & Thorbiörnson, 2001]. The former consider belief distributions, but restricted to the probability case and interval representations. Another limitation is that it does not address the relation between distributions over spaces of one or several dimensions respectively. The same criticism applies to [Hodges & Lehmann, 1952], [Hurwicz, 1951], and [Wald, 1950]. None of these, nor [Ekenberg & Thorbiörnson, 2001], handle the issues of tree representation or evaluation at all. Furthermore, no detailed procedures or suggestions are provided for how to represent or how to evaluate aggregations of belief distributions.

The Delta method for handling vague and imprecise information has been developed in a number of papers, e.g. [Danielson & Ekenberg, 1998] and [Ekenberg, 2000]. The method has been used in a wide variety of contexts, e.g., deposition of nuclear waste, investment situations, and evaluation of offers in purchase situations [Danielson et al, 2003b]. The method was invented to counter the problems with unnatural precision and to provide computational concepts for handling imprecise probabilities and values. The approach is a single-level approach, not able to handle multi-level decision trees where the outcome of one event can depend on previous outcomes. The Delta method as it is known to date does neither use general multi-criteria hierarchies nor algorithms for trees. Earlier known algorithms are not applicable to problems with trees, be they probabilistic, multi-criteria, or a combination thereof. Neither belief distributions nor procedures for aggregated interval estimates (such as weighted expected values) have been considered earlier.

SUMMARY OF THE INVENTION

It is an object of the present invention to overcome disadvantages of conventional decision models. The invention presents solutions to many of the deficiencies of earlier approaches. None of the earlier approaches combine criteria hierarchies, weights, probabilities, and values as the present invention does.

It is a further object of the present invention to provide algorithms suitable for a decision model and in particular suitable for fast software implemented decision models executable on a computerized decision device.

Interval representations and similar ways of expressing uncertainty seem also to be unnecessarily restrictive. The present invention allows for higher order effects to be taken into account when handling aggregations of interval representations, such as in decision trees or probabilistic networks. This is independent of whether higher-order distributions are explicitly introduced or not. The same methods that will be presented below can also be applied for higher-order distributions as well, but, in practice, it is seldom necessary.

In particular, the invention is a decision device and a family of methods for probabilistic, multi-criteria analysis that extends the use of additive and multiplicative value functions for supporting evaluation of imprecise and uncertain facts. Furthermore, it relaxes the requirement for precise numerical estimates of values, probabilities, and weights in multi-criteria and decision trees. One component is the possibility to express uncertainty with interval estimates, relations and belief distributions over the solution sets to such statements. The evaluation is preferably done relative to a set of decision rules, generalizing the concept of admissibility and computationally handled through the optimization of aggregated value functions. The distribution of belief in the resulting aggregations can also be handled. This is typically important when evaluating decision trees of the kind in the invention. Furthermore, this measure can be used for enhancing the computational speed considerably. The centroid of the resulting distribution is the product of the centroids of the components. Thus, a procedure calculating with only the centroid yields a very good estimate already at quite shallow tree depths.

In accordance with one preferred embodiment, the invention comprises a unifying representation format for all the components involved.

In accordance with another preferred embodiment, the invention contains procedures for calculating and comparing generalizations of the expected value of a set of alternatives under several criteria and thus provides a well-founded procedure for decisions.

In accordance with yet another preferred embodiment, the invention contains a method for aggregating belief distributions over criteria weights, probabilities, and values in decision trees as well as a procedure for measuring the properties of the belief distributions of a result.

BRIEF DESCRIPTION OF THE FIGURES

The present invention will now be described in more detail by way of non-limiting examples and with reference to the figures, which intend to illustrate some features of the innovation, and which are not intended to be limiting, where.

$$-\text{Log}(z), \frac{\text{Log}(z)^2}{2}, \frac{-\text{Log}(z)^3}{6}, \frac{\text{Log}(z)^4}{24}, \frac{-\text{Log}(z)^5}{120}, \frac{\text{Log}(z)^6}{720}.$$

Figure 16:
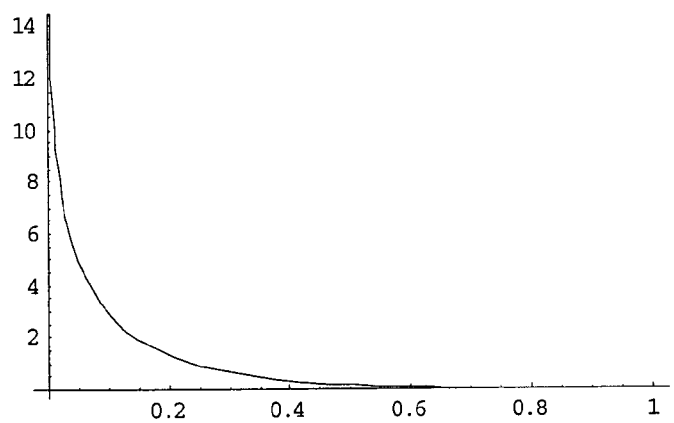

FIG. 16 shows the graph of the function $-4 \cdot (2-2z+\text{Log}(z)+z \cdot \text{Log}(z))$.

Figure 17:
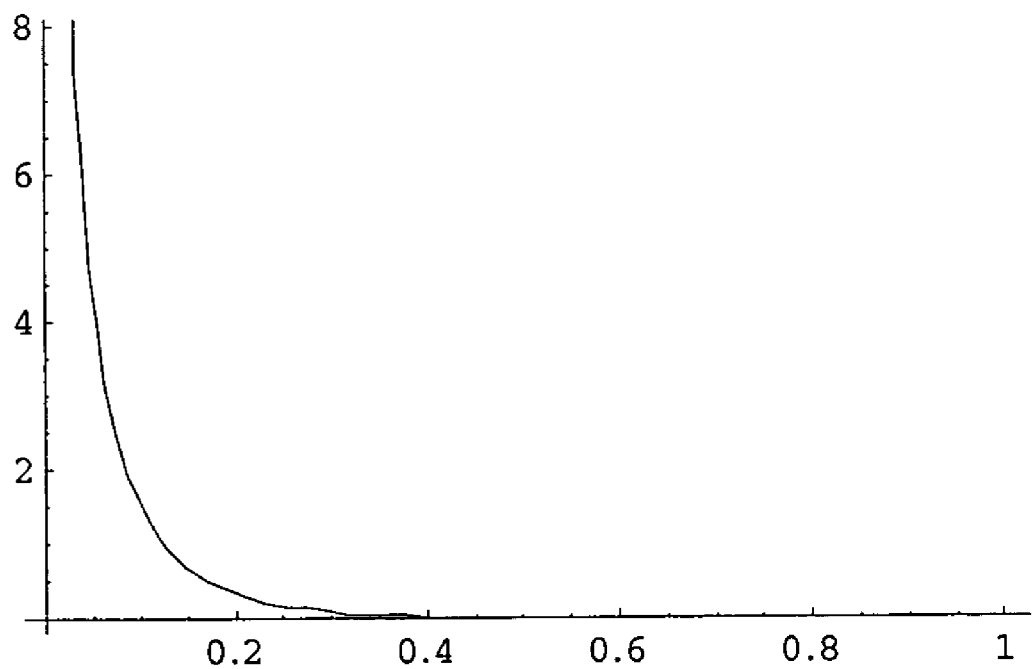

FIG. 17 shows the graph of the function $-4 \cdot (-12+12z-6\text{Log}(z)-6z \cdot \text{Log}(z)-\text{Log}(z)^2+z \cdot \text{Log}(z)^2)$.

Figure 18:
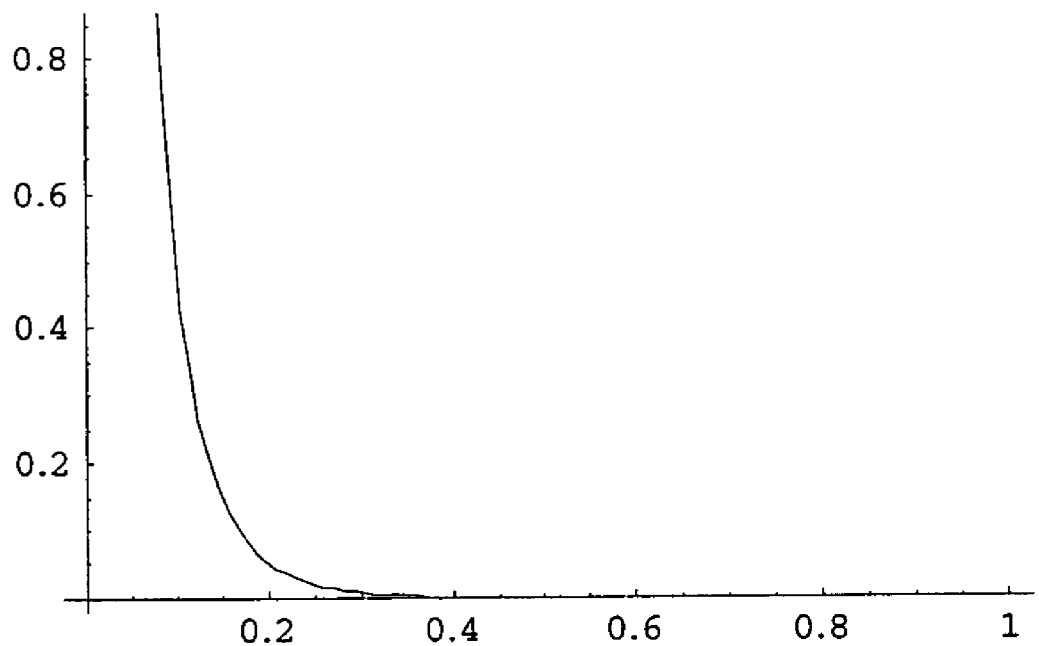

FIG. 18 shows the projection of the distribution over a 4-ary tree of depth 3. The resulting centroid is $¼^3$.

DETAILED DESCRIPTION OF PREFERRED EMBODIMENTS

Figure 1:
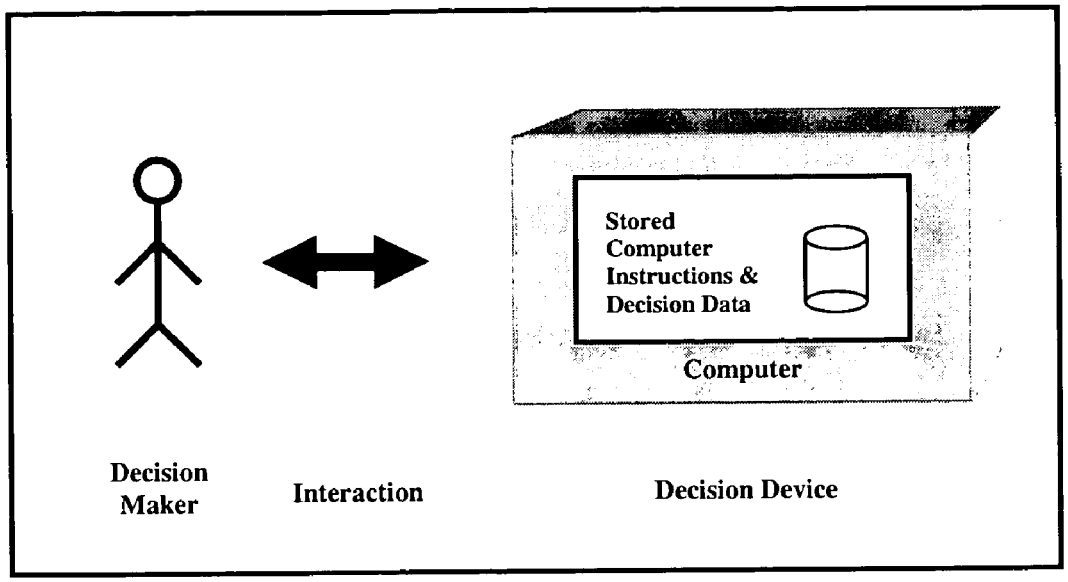
FIG. 1 is a schematic diagram of an exemplary operating environment for a system configured in accordance with the present invention.

In accordance with the present invention a method for analyzing decisions and aiding decision makers is provided. The method also extends to a process and a decision device or tool, which preferably comprises of modules and algorithms as they could be implemented in a computer program, i.e., the invention can preferably be implemented as computer instructions (software) and applications, where the procedures and algorithms can be executed by software. FIG. 1 shows an example of an operating environment for a system. The decision maker interacts with the decision device, which in a preferred embodiment is implemented as a computer system comprising suitable hardware (processing unit, display device, input device) and stored instructions (software) for the procedures.

The decision device implements and supports the decision method and process applied for. In the decision process, the key structural modelling elements are alternatives, criteria, events, sub-decisions, and consequences. A decision situation typically consists of selecting among possible courses of action, i.e. alternatives. The act of selection is referred to as a decision. The selection is based on an understanding of the decision situation in the form of being able to specify the consequences of the selection. There are several types of decision problems, viz. multi-criteria problems, probabilistic event problems, and risk problems. It is a feature of the present invention to be able to handle all of these problems, and combinations thereof, using one basic approach.

The person, or group of people, intending to make a decision is here collectively referred to as the decision maker. It is a further feature of the present invention to be able to handle a group's decision making in a manner similar to a single person's. Furthermore, the decision maker might be a computer program, e.g. a software agent that faces a decision situation in some environment. The present invention is also applicable to non-human decision makers provided that it structures the decision problem in a form as set forth below. For presentational clarity, a device for human decision makers is used as example in the description herein, but the description applies equally to other types of decision makers.

In accordance with one preferred embodiment of the present invention, the decision maker, employing a decision device, specifies the decision problem by building a model of the decision situation. The decision maker begins by assigning labels (names) to the alternatives in the decision problem. It is a feature of the present invention that alternatives can be removed, added, or modified during the decision process, but any interesting decision problem has at least two alternatives. (Risk analysis described later contains only one course of action.) For each alternative, its consequences are specified. A consequence might be either an event (leading to further consequences), a sub-decision problem (with a conditional set of alternatives), or a final consequence (denoting the final granularity for that consequence in the model). It is a feature of the present invention to be able to mix these in any order, as long as each path ends with a final consequence. Thus, each alternative is represented by a tree. Consequences can be removed, added, or modified during the decision process.

For each event, the decision maker specifies which consequences the event may have, and with which probabilities they may occur. The consequences may again either be events, sub-decision problems, or final consequences in any mix. It is required that the consequences of an event are covering and mutually disjoint, i.e. exactly one is obtained once the event has occurred. In the model, this is easily catered for even if the decision maker is not able to specify all relevant consequences by adding a residual consequence absorbing all non-specified possibilities. It is a feature of the present invention that the probabilities for the events need not be specified as fixed numbers. They can be specified as intervals instead, e.g. [20%, 40%], meaning that the probability for a specific event occurring is between 20% and 40%. They can also be specified as comparative relations, e.g. "the probability of event A is greater than the probability of event B" or "the probability of event A is at least 10% greater than the probability of event B". Intervals and comparative relations can be mixed in any order. Note that fixed probabilities are easily taken into account by specifying an interval in which the endpoints are identical. Thus, fixed probabilities can be mixed with intervals and comparative relations in any order.

The intervals can be further qualified by asserting varying belief in different parts of the intervals through a belief distribution. In accordance with a preferred embodiment the decision device admits for discrimination between different beliefs in different values. Thus, a decision maker does not necessarily have to believe with the same faith in all possible values within each interval. In order to enable a differentiation of the significance of different values, belief distributions expressing various beliefs are allowed over a multi-dimensional space, e.g., the solution sets of the interval estimates and relations involved. Then it becomes possible to state sentences with semantics similar to, e.g., "the probability of event A is between 20% and 40%, but the belief is concentrated to the values between 25% and 35%, even if the others are possible". If the decision maker does not qualify the information in this sense, the belief distributions can be modelled as, e.g., uniform over the feasible solution sets to the interval statements and relations For each final consequence, the decision maker specifies the value of each on a value scale, be it a monetary scale or any other scale. It is a feature of the present invention that the values of the final consequences need not be specified as fixed numbers. They can be specified as intervals instead, e.g. [100, 200], meaning that the value of a certain consequence is between 100 and 200 (e.g. dollars). They can also be specified as comparative relations, e.g. "the value of consequence K is larger than the value of consequence L" or "the value of consequence K is between 50 and 75 larger than the value of consequence L". Intervals and comparative relations can be mixed in any order. Note that fixed values are easily taken into account by specifying an interval in which the endpoints are identical. Thus, fixed values can be mixed with intervals and comparative relations in a manner similar to probabilities. Belief distributions over the values are a part of the present invention.

This representation of uncertainty takes care of incomplete information. Most often, the decision maker has some idea or understanding of the various parts of the problem being modelled in the process. Then, the decision maker can enter this information, however incomplete, into the decision device, thus being able to use it in a first analysis. Even if, in the worst case, there is no information available, this can also be represented in the process by the widest intervals conceivable. The decision situation is still amenable to analyses, and as more precise or complete information becomes available, it can be entered into the process by the decision maker. It is a feature of the present invention to be able to handle incomplete, imprecise, or missing information.

The alternatives can be considered under several different criteria. Then each criterion may have its own consequences, forming a separate criterion-problem. Each criterion-problem can be considered separate, then in effect being a separate decision problem as above. It is a feature of the present invention that the criteria may be considered together, even if each criterion is a decision problem on its own with separate events (even event chains, i.e. events leading to new events). All criteria and all event chains are then modelled together in a criteria-consequence tree, which is evaluable using procedures described in this invention. Criteria weights are stated in a fashion similar to probabilities and values, including belief distributions over the solution sets of the statements. For each criterion, the decision maker specifies how important it is in the terms of weights. It is a feature of the present invention that the weights for the criteria need not be specified as fixed numbers. They can be specified as intervals instead, e.g. [10%, 30%]. They can also be specified as comparative relations, e.g. "the importance of criterion A is greater than the importance of criterion B" or "the importance of criterion A is equal to the importance of criterion B". Intervals and comparative relations can be mixed in any order. Note that fixed weights are easily taken into account by specifying an interval in which the endpoints are identical. Thus, fixed weights can be mixed with intervals and comparative relations in any order.

In a preferred embodiment the device makes use of various decision rules, such as the expected value rule. Alternatives are compared, either pairwise or all at once, to find out which ones are superior to one another. When the input data is imprecise, the result will be ranges (intervals) of the expected values with varying support (belief) within the intervals.

Automated sensitivity analyses are required to further discriminate between the alternatives. Carrying out an ordinary sensitivity analysis means to adjust each variable up and down individually or jointly and plot the result in, e.g., tornado diagrams. It is a feature of the present invention to be able to carry out sensitivity analysis on all (or a selected subset) of the probabilities and values at the same time. This is preferably carried out by a contraction procedure that simultaneously contracts (decreases) the feasible intervals (the orthogonal hull, Definition 9) of each participating variable (probabilities, values, or both kinds) towards a focal point (Definition 10), often the centroid (Definition 25).

The belief distributions over the feasible probability distributions, value functions, and weight functions can be aggregated during the evaluation process and used in a procedure for determining which results, in the range of feasible results, are the most relevant.

Similarly, the process and device in this invention are also suitable for risk analyses under incomplete information. In a risk analysis, the main task is not to select among alternatives, but rather to analyze the risks involved in a situation. Typically, the risk situation consists of possible events, often linked in event chains, i.e. following an event is another event as a consequence of the former, a.s.o. The modelling steps are similar to the decision problem, but there is no choice of alternatives. Events, probabilities, consequences, and values are specified in the same manner, using only the degree of precision that is available. The analysis task is then to calculate the span of the expected value for the risk situation.

The process and device in accordance with the present invention are also suitable for probabilistic networks with incomplete information. A probabilistic network contains chains of events dependent on each other, where one node is a precondition for the event in the subsequent node in a (directed) path. Decisions are made in probabilistic networks through adding values into influence diagrams and then transforming the networks to decision trees. The multiplication of probabilities occurring in probabilistic networks is procedurally equivalent to the evaluation of event chains in decision trees.

For group decisions, it is common for the individuals participating in the decision process not to agree fully on all input data. In accordance with the present invention, this situation can be handled in the following manner. When there is disagreement over a probability or a value, the individual (or sub-group) statements are recorded separately. Then, for the evaluation, a group interval is formed to cover all the different statements. The group's belief distribution is a combination of the individuals's beliefs. The group's focal point is calculated from the different focal points, taking the sizes (and importance) of the different group members into account. During the contraction process, it is recorded how much of each individual's (or sub-group's) feasible regions have been reduced. This can be termed the compromise for each participant. The number and extent of compromises required to reach a decision can be displayed to the decision group as a basis for negotiation. It is a feature of the present invention to be able to handle individuals' statements and preferences in a group decision process.

Figure 2:
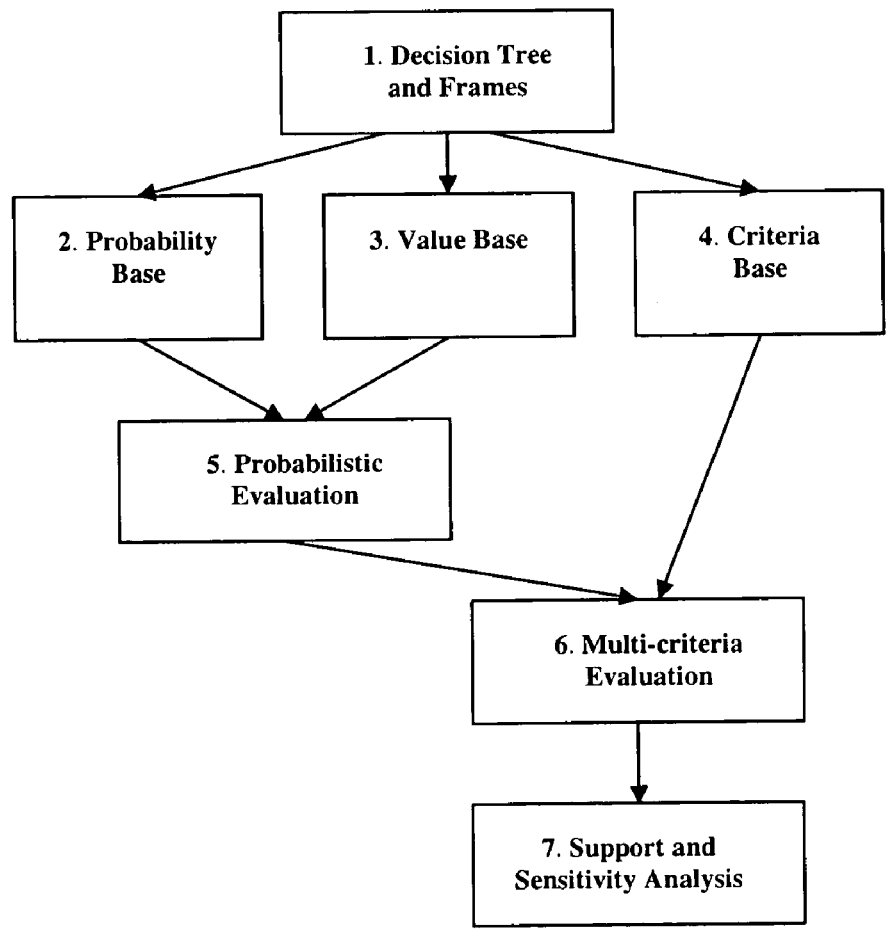
FIG. 2 shows a block diagram of the modules of the decision device.

An exemplary decision device in accordance with the present invention is schematically depicted in FIG. 2. The different blocks of the device each comprises computer instructions (software) executable on suitable computer hardware. The decision device interacts with the decision maker in all blocks (not shown in the figure).

Figure 4:
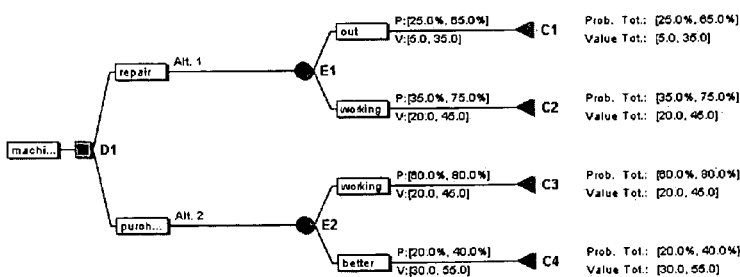
FIG. 4 shows a decision tree with constraint sets.

Block 1: The decision tree is interactively constructed by the decision maker as in Definition 1 and Definition 2 as set out below, and stored in the decision tree module, which contains representation of all alternatives, criteria, events, sub-decisions, and consequences in a tree form, such as depicted in FIG. 4, or any equivalent or similar form of representation. The entire decision situation is modelled by a generalised decision tree (a rooted tree connected to a decision frame, see below). Each alternative under each criterion is represented by a separate tree frame as set out in Definition 19 below, which connects bases to the structure. Finally, all tree frames are joined together by a decision frame for example as set out in Definition 20 below, that links the alternatives under each criterion with the criteria (importance) weights to the full representation of a probabilistic multi-criteria decision tree. By omitting the probabilities, a deterministic multi-criteria weight tree problem is obtained. By omitting the weight tree, a probabilistic decision tree problem is obtained.

Blocks 2 to 4: The decision maker statements of probability, value, and criteria weights are recorded as interval constraints, as set out in Definition 3 below, in probabilities, values, and criteria weights respectively and collected into constraint sets, see Definition 5 below. The constraint sets are checked for consistency, see Definition 6 below. This is done as a side effect of determining the orthogonal hull, as described in Definition 9 below. The orthogonal hull is determined by Procedure 1 described below. Consistent constraint sets together with the orthogonal hull are referred to as bases. The decision device as described herein keeps three kinds of bases. As criteria weights and probabilities are very similar, the probability bases (Block 2; Definition 13 and Definition 14 see below) share the same properties as weight bases (Block 4; Definition 11 and Definition 12, see below) but with different kinds of information. Value bases (Block 3; Definition 15, see below) are kept in a separate module, together with security bases see Definition 16 below. Furthermore, the bases contain information on the decision maker's belief in different parts of the intervals see Definition 17 and Definition 18 below.

Block 5: One purpose of modelling the decision situation is to gain further insight into the problem. Another purpose is to be able to evaluate the decision given the information available. The primary decision rule is maximizing the weighted expected value, see Definition 21 below, i.e. the expected value of each criterion weighted by its relative importance stated as criteria (importance) weights. As a starting point, the decision device obtains the maximum (and likewise the minimum) of the weighted expected value in the decision tree in two steps. The first step is done through a set of procedures, which obtains components of the weighted expected values. In the example described herein, this is done using Procedures 2 to 6 as set out below.

Block 6: The second step is to aggregate the criteria by means of criteria weights using Procedure 6 below, which obtains the weighted expected values of the entire decision frame. From the weighted expected value, several versions of the decision rule are obtained. Upper and lower bounds of the weighted expected value are communicated to the decision maker. As a complement to maximizing weighted expected values, security levels can be used to filter out alternatives that are too risky (see Procedure 7 below). In order to continue the analysis, the varying belief in the endpoints of the weighted expected values and all intermediate values must be taken into consideration. The local distributions of the belief by the decision maker (see Definition 24) generate centroids (see Definition 25), which act as most representative (believable) points, i.e. they are focal points in accordance with Definition 10 below. If there are no explicit distributions, uniform distributions (i.e. no discrimination information) or other suitable distributions can be assumed. The belief in the resulting weighted expected value is obtained by multiplications (see Definition 26) and additions (see Definition 27). A resulting belief distribution can be obtained by iterating Definition 26 and Definition 27. For instance, a belief distribution over the expected value formula as set out in Definition 21 can be obtained by an iterative process.

Block 7: Using a procedure for determining belief distributions in accordance with Definition 28, only the interval parts with sufficient support (belief) are considered in the final analysis stage including sensitivity analyses of the results.

Figure 3:
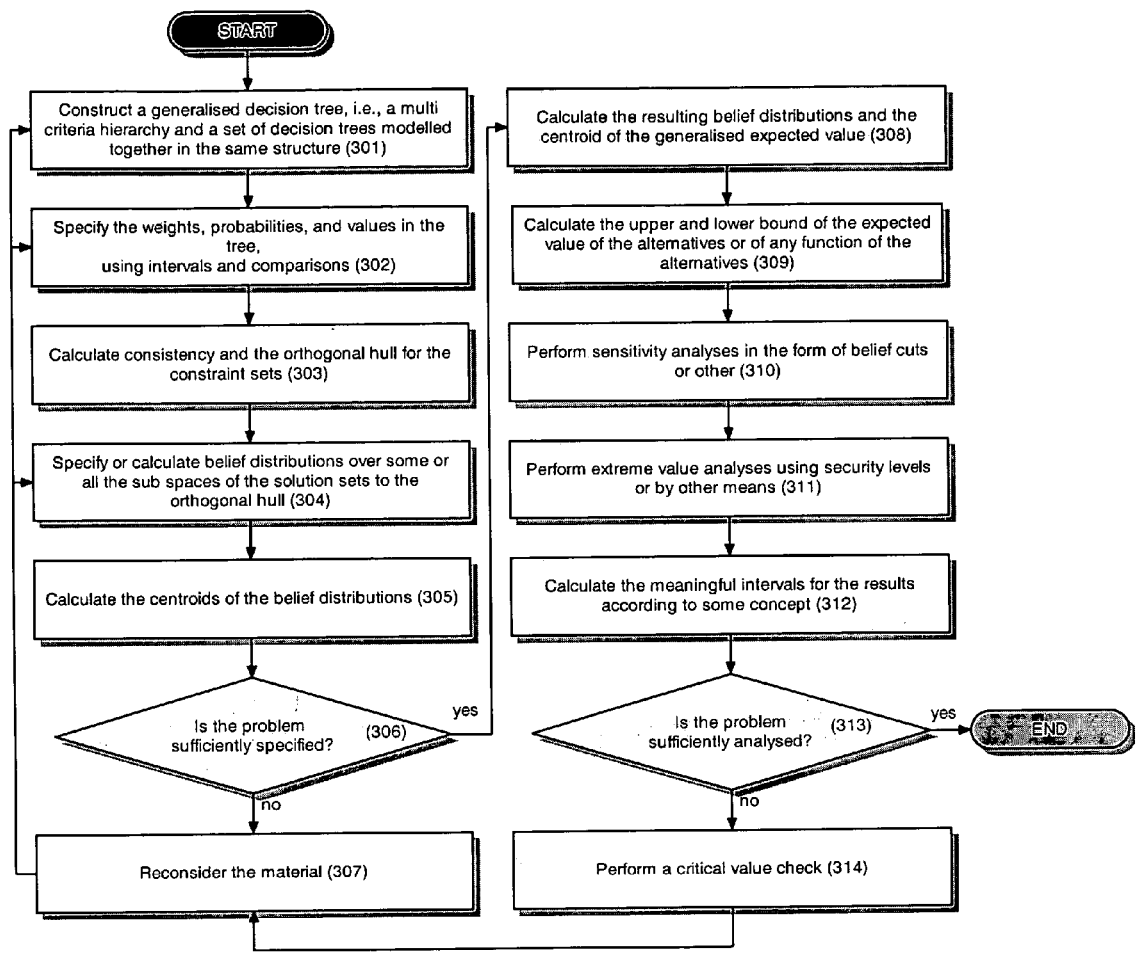
FIG. 3 shows the overall process.

FIG. 3 shows an instance of an overall process in accordance with a preferred embodiment of the invention. Among others, the ordering of the operations can be altered or substituted. A process as described in conjunction with FIG. 3 can be executed on any suitable decision device, for instance in the form of a computer system with stored computer instructions, which instructs the device to perform the steps of a process aimed at analyzing a risk or decision situation involving different criteria, alternatives, events, and consequences. The device could preferably also able to carry out risk analyses in which events and consequences are specified. As stated earlier, a risk analysis can be equally considered as a decision between the risk situation and a zero alternative. Thus, both types of problems are henceforth referred to as decision problems. The entity posing the problem can be a human decision maker or group of decision makers, or it can be a non-human decision maker (such as other devices) or a set of such decision makers.

First, in a step 301, the decision situation is modelled with a generalized decision tree using alternatives, criteria, sub-decisions, events, and consequences and the construction of a decision frame using components from Definition 1 and Definition 2. Modelling the criteria hierarchy and the decision situation is in the same, unified format as set out below in Definition 19 and Definition 20.

Thereupon, in a step 302, weights, probabilities, and values in the tree are specified, only to the degree of precision available, using intervals and comparisons also as set out below in Definition 3 and Definition 4. The statements are collected in bases as in Definition 5 and Definitions 11-15. Next, in a step 303, consistency and the orthogonal hull for the constraint sets are calculated. This is described below in Definition 6, Definition 7, Definition 8, Definition 9, and Procedure 1, and is applied to bases of Definitions 11, 12, 14, and 15.

Next, in a step 304, belief distributions over some or all the sub spaces of the solution sets to the orthogonal hull are specified or calculated. These distributions model the explicit and implicit beliefs of the decision maker as set out below in Definition 17, Definition 18, Definition 23, and Definition 24.

Next, in a step 305, centroids of the belief distributions are calculated using Definition 25 below as well as in the analogous distributions over sub-sets derived using Definition 23.

Thereafter, it is checked whether the problem is sufficiently specified with the granulation of consequences in a step 306 given the available information. If so, the process proceeds to a step 308. Otherwise the process proceeds to a step 307.

In step 307, the material is reconsidered, including consideration of the consequences for the belief distributions. This step 307 preferably further includes the use of the local projection $$f(x_i) = \int_{B_i^-} dV_{B_i^-}(x) = (n-1)(1-x_i)^{n-2}$$

of a uniform belief distribution solution sets of the bases as a representation of belief in interval estimates. As an example, a partition of a consequence into a set of consequences must be consistent with respect to such aspects. The same is the case in all sub-spaces—not only one-dimensional ones.

When the generalised decision tree needs to be remodelled with respect to the alternatives, events, consequences, sub-decisions, or criteria, the procedure then returns to step 301.

When the generalised decision tree needs to be remodelled with respect to the weights, probabilities, or values, the procedure then returns to step 302.

When the generalised decision tree needs to be remodelled with respect to the various belief distributions, the procedure then returns to step 304.

In step 308, the resulting belief distributions and the centroid of some decision rule is calculated. For instance, the belief distributions and the centroid of the generalised expected value using iterations of Definition 26 and Definition 27 below are calculated. In particular, in a preferred embodiment, this step contains the evaluation of decision and risk situations including the belief distributions as iterations of Definition 26 and Definition 27 generating belief distributions over forms such as $$E(A_i) = \sum_{j=1}^{m_1} w_j \sum_{k=1}^{m_2} w_{jk} \sum_{m=1}^{m_3} p_{im} \sum_{n=1}^{m_4} p_{imn} v_{imn1}.$$

Next, in a step 309, upper and lower bound (i.e. max and min) of the expected value of an alternative or any function of the alternatives are calculated for example as set out in Definition 21, Definition 22, and Procedures 2 to 6.

Thereupon, in a step 310, sensitivity analyses are performed in the form of belief cuts (see below) and other suitable methods in one or more variables at different levels in the decision tree at the same time. The most representative point is communicated (the centroid, Definition 25). Then, the sub-intervals around the centroid representing the main belief are communicated, along with means of manipulating the widths of the sub-intervals through specifying varying amounts of mass inclusion.

Next, in a step 311, extreme value analyses are performed for example using security levels as set out below in Definition 16 and Procedure 7 or by other suitable means.

Next, in a step 312, intervals that are meaningful for the results according to some concept, e.g., the evaluation of decision and risk situations including a procedure for determining the concept of warp of the results as a function of the concentration of the belief distributions are calculated using a suitable method for example as set out below in Definition 28.

The steps 301-312 are iterated through steps 313-314 until the decision maker is satisfied with the analysis.

In step 313, it is checked whether the problem is sufficiently analyzed. If not, perform a critical value check in step 314 by instantiating m of the total of n variables and varying the remaining n–m variables. Then go to step 307. Otherwise stop and present the result.

On possible instance of the critical value check is to instantiate m variables with their centroid components and then calculate the possible variation of the expected values of the alternatives, by varying the remaining n–m variables.

Another possible instance of the critical value check is to instantiate one variable with its maximum possible value and then calculate the possible variation of the expected values of the alternatives, by varying the remaining n–1 variables.

To gain a better understanding of the present invention, a brief illustration of a very small instance of the invention will now be described. It is merely to be seen as a small artificial example and is not intended to be delimiting in any respect.

A medium-sized manufacturing company relied in one of its most important production lines on an old machine, to which spare parts had become increasingly harder to obtain. At a critical moment, the machine broke down in a more severe way than previously. It became clear to management that the machine was a potential threat to future operations unless it was either thoroughly repaired or replaced by a new machine. Using the invention, such a decision can be analyzed from several points of view, i.e. under several criteria. However, the example will only treat one of these, net profits.

Scanning the market for this type of machine, the production engineers found that such machines are no longer on the market. Newer, multi-purpose machines have taken their places, but at substantially higher investment costs. In the used market, though, those older single-purpose machines are still a popular choice for their relative cheapness and durability. Thus, management is faced with the following decision situation involving two alternatives:

$A_1$: Repair the old machine. This would be possible with custom-made spare parts, but at higher cost than standard parts and with unknown quality. Also, the future capacity of the machine is doubtful as many other parts of it are approaching age limits.

$A_2$: Purchase a modern machine. Such machines are available from several suppliers. Their representatives are used to selling this kind of equipment, thus making the possession of the machine quite uncomplicated. A modern machine, though, has many more functions than required for the job and the cost of the extra features drain the cash flow from the production line.

When selecting a particular course of action, a number of consequences may occur during the five year write-off period considered. It is important that for each action, the set of consequences in the method is exhaustive and exclusive, i.e. exactly one consequence will subsequently occur. For the two alternatives, the following relevant consequences were identified.

Alternative $A_1$—Repairing the Old Machine:

$C_{11}$: The machine will be out of order for a considerable part of the next five years, and will not function properly when in operation. The result is both less quantity and less quality than today and than the customers expect.

$C_{12}$: The machine will be working most of the time, but will not always function properly when in operation. The result is full quantity but less quality than today and than the customers expect.

Alternative $A_2$—Purchasing a Modern Machine:

$C_{21}$: The modern machine will be working most of the time, and will function properly when in operation, better than the old machine did before the major breakdown. The result is full quantity and full quality as the customers expect.

$C_{22}$: The modern machine will be working as well as in $C_{21}$. In addition, it admits the production of new goods for which there is a sizeable market. Profits are not that high, though, since the company does not have a strong market position.

The profits over the five year period when adopting the strategies of the respective alternatives have been estimated by the financial department. They are given as ranges and are as follows:

| Alternative $A_1$ | |
|---|---|
| Consequence $C_{11}$ | 20-40 MUSD |
| Consequence $C_{12}$ | 35-50 MUSD |
| Alternative $A_2$ | |
| Consequence $C_{21}$ | 50-60 MUSD |
| Consequence $C_{22}$ | 60-80 MUSD |

The costs of adopting the strategies of the respective alternatives have also been estimated by the staff. They are given as ranges and are as follows:

Alternative $A_1$ 5-15 MUSD
Alternative $A_2$ 25-30 MUSD

Note that the greater uncertainty regarding the costs for repairing the old machine is reflected by a wider cost interval.

The net profits over the five year period are then calculated as profit less investment costs. They are given as

| Alternative $A_1$ | |
|---|---|
| Consequence $C_{11}$ | 5-35 MUSD |
| Consequence $C_{12}$ | 20-45 MUSD |
| Alternative $A_2$ | |
| Consequence $C_{21}$ | 20-45 MUSD |
| Consequence $C_{22}$ | 30-55 MUSD |

Finally, the probabilities of all consequences within each alternative were estimated given that the alternative was chosen. They are given as ranges and are as follows:

| Alternative $A_1$ | |
|---|---|
| Consequence $C_{11}$ | 25-65% |
| Consequence $C_{12}$ | 35-75% |
| Alternative $A_2$ | |
| Consequence $C_{21}$ | 60-80% |
| Consequence $C_{22}$ | 20-40% |

In the interval estimates above, we assume, for presentational simplicity, that the beliefs in the various values are uniformly distributed. Furthermore, we also assume that no relations exist between the values of the consequences. Non-uniform belief and relations between probabilities or between values are handled by the present invention but would unnecessarily complicate the example.

This situation can be represented in a decision tree as in FIG. 4.

Figure 5:
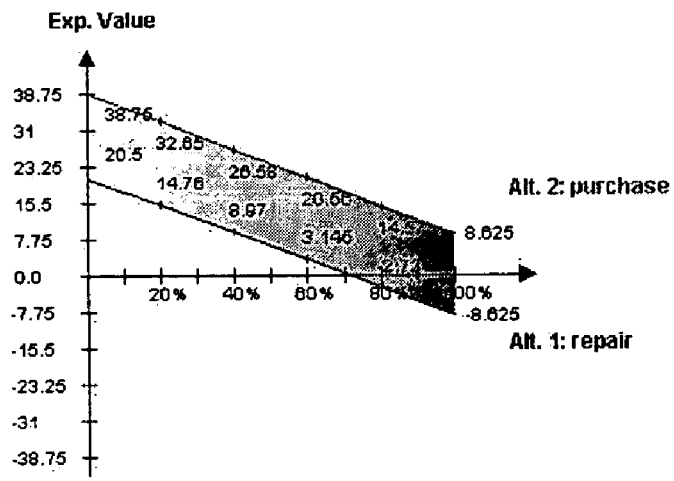
FIG. 5 shows a result from an evaluation of a decision problem.

Next, some of the procedures of the invention can be used for evaluating the situation. In this case, we can see such a result in FIG. 5. The result is shown including a sensitivity analysis and the alternative Purchase is the preferred one.

The x-axis shows a contraction (an automatic sensitivity analysis) in percent, for zooming in on central parts of the intervals. The y-axis shows the difference in expected value between the alternatives. Furthermore, calculations as will be discussed below result in that the left part is not important to consider, because the belief in these values must necessarily be low.

The results should therefore be interpreted as the upper alternative in the figure being the preferred one. This does not mean that it is entirely impossible for the other to be more favourable than the preferred one. As long as the graph of Repair is above the x-axis, there is such a possibility. However, the likelihood that Purchase is the alternative to prefer is substantially higher, so this should definitely be chosen if no other information is available. End of example.

Figure 6:
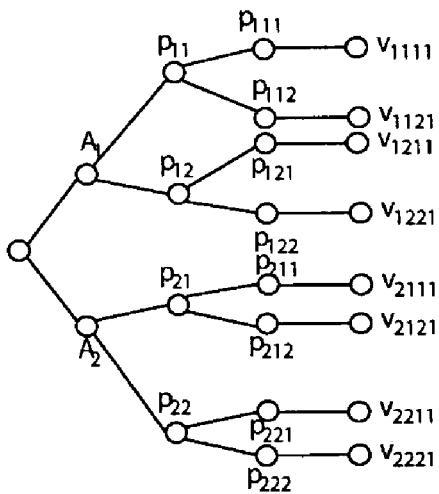
FIG. 6 shows a general decision tree.
Figure 7:
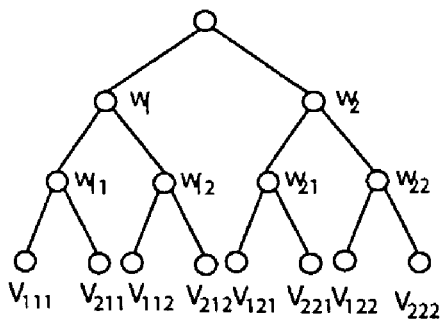
FIG. 7 is a schematic view of a criteria hierarchy.
Figure 8:
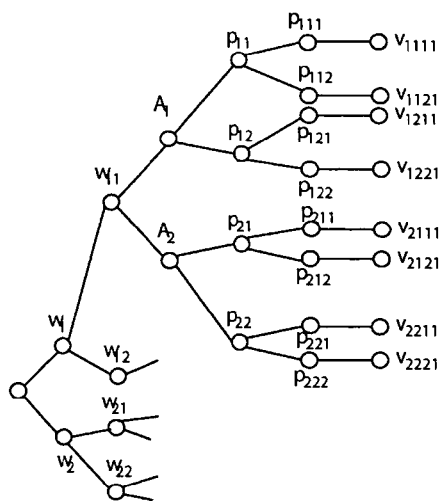
FIG. 8 is a schematic view of the representation format of the problem structure in the framework.

As has been seen above, criteria hierarchies and decision trees are both trees of a similar kind. Consider the examples in FIG. 6 and FIG. 7. Instead of valuing the alternatives directly as in an ordinary multi-criteria analysis, the value of an alternative can be calculated from a probabilistic decision tree, i.e., the valuation of the alternatives can be included in the multi-criteria tree. In FIG. 8, the alternative values under weight $w_{11}$ in the criteria hierarchy have been substituted by entire decision trees. In the figure, the tree structure is symmetric. This is, however, not a necessary condition and the respective decision tree parts can be entirely different.

The expected value of the alternatives in FIG. 8 can now readily be calculated with respect to this structure.

$$E(A_i) = \sum_{j=1}^{2} w_j \sum_{k=1}^{2} w_{jk} \sum_{m=1}^{2} p_{im} \sum_{n=1}^{2} p_{imn} v_{imn1}.$$

Figure 9:
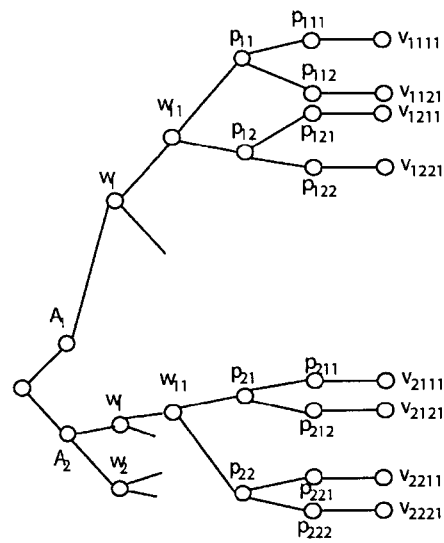
FIG. 9 shows a tree equivalent with the tree in FIG. 8.

The positions of the nodes $A_i$ do not affect this value, but it simplifies the presentation if these nodes are on the second level in the tree. In FIG. 9 a computationally equivalent tree to the tree in FIG. 8 is shown. It is a feature of the present invention to transform the trees w.r.t. the alternative nodes $A_i$, shifting their position while preserving the meaning of the tree. This enables the efficient execution of Procedures 2 to 7.

In the next few sections, the criteria-consequence structure is formalized and it is explained how numerical imprecision and relations can be modelled and evaluated.

The decision device represents the user decision problem in a tree form. Then, it is possible to evaluate the alternatives under consideration using several principles, among them maximizing the expected value (utility). The work with the decision device is preferably carried out interactively in several rounds (iterations), see FIG. 3. For each iteration, more precise and complete information can be entered, finally leading up to an understanding of the decision situation and the results of which forms a basis for making the decision. Note that it is not necessary to enter information on every item in order to be able to start the process. Parts of the information could be left out to begin with.

The decision-maker's situation is modelled as a decision frame. The frame is a key data structure in the method, holding references to other structure information and to the bases containing most of the information. All statements entered via the decision device user interface are collected in the decision frame. The device keeps the bases, and thus the decision frame, consistent at all times.

The decision device stores the user's information in several ways. The user models the decision problem in a tree form. Each alternative under each criterion can be considered a separate sub-tree, here denoted a rooted tree. The "user" should not be taken to mean only human users; it may also be other processes, computer agents, or other stored computer programs.

Definition 1.

A graph is a structure <I,N,E>, where I is an index-set, N is a set $\{n_i\}$, $i \in I$, of nodes and E is a set $\{(n_i,n_j)\}$, $i,j \in I$, $i \neq j$, of edges (node pairs). A tree is a connected graph without cycles. A directed tree is a tree where the node pairs are ordered, i.e., $(n_i,n_j) \neq (n_j,n_i)$.

Definition 2.

A rooted tree is a directed tree <I,N,E,r> where exactly one node $n_r$ has the property $\neg \exists k:(n_k,n_r) \in E$. $n_r$ is called the root of the tree. The set N is partitioned into two subsets of leaf nodes ($N^L$) and intermediate nodes ($N^I$). $n_i \in N^I$ iff $\exists k:(n_i,n_k) \in E$. Since $N^L = N/N^I$, $n_i \in N^L$ iff $\neg \exists k:(n_i,n_k) \in E$. The index-set I is partitioned accordingly: an index $i \in I^I$ iff $n_i \in N^I$ and an index $i \in I_L$ iff $n_i \in N^L$. An intermediate node $n_i \in N^I$ has children indices $C_i = \{j:(n_i,n_j) \in E\}$.

Figure 10:
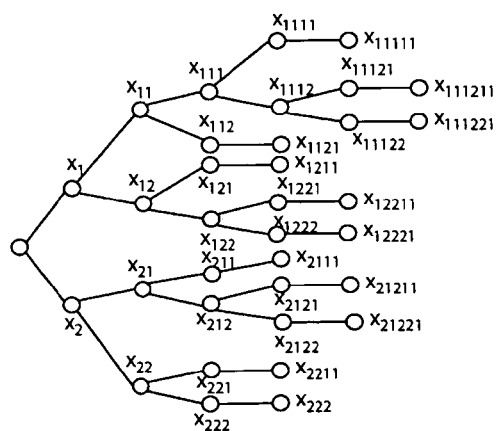
FIG. 10 shows criteria-consequence tree.

A possible labelling is demonstrated in FIG. 10.

A rooted tree used for representing criteria trees and decision trees modelled in the same structure is referred to as a generalised decision tree. This is the case even when the criteria or the decision part do not contain any nodes.

Constraint Sets

All the user statements are collected together into sets of constraints. When the decision structure is properly in place, it is used to capture user statements in a straightforward way. There are two types of constraints. User statements are translated into user constraints (such as range or comparative, see below). One technique is to present the decision-maker with a graphical interface where the statements can be interactively entered. Another technique is to translate linguistic statements by translation rules. The other type of constraints is structural constraints (such as normalization), emanating from the structure of the problem.

Weight Statements

To handle user weight statements (intervals and comparisons) computationally and mix them with fixed numbers, they are translated into a suitable form. This means that they are translated into inequalities, using the above suggested interval format.

Range statements translate into range constraints. A reasonable interpretation of such statements is that the estimate is not outside of the given interval but without any explicit hint as to where it might be inside of it.

Comparative statements compare the weights of two criteria with one another, such as "the criteria $C_1$ and $C_2$ are equally important" or "the criterion $C_3$ is more important than $C_4$". Those statements are translated into comparative constraints.

Probability Statements

To handle user probability statements (intervals and comparisons) computationally and mix them with fixed numbers, they are translated into a suitable form. This means that they are translated into inequalities, using the above suggested interval format.

Range statements translate into range constraints. A reasonable interpretation of such statements is that the estimate is not outside of the given interval but without any explicit hint as to where it might be inside of it.

Comparative statements compare the probabilities of two consequences occurring with one another, such as "the events $C_1$ and $C_2$ are equally probable" or "the event $C_3$ is more likely to occur than $C_4$". Those statements are translated into comparative constraints.

Value Statements

Value statements are considered in a manner similar to the probability statements. The value statements are translated into interval form in order to be entered into the decision problem.

Range statements translate into range constraints. A reasonable interpretation of such statements is that the estimate is not outside of the given interval but without any explicit hint as to where it might be inside of it.

Comparative statements compare the probabilities of two consequences occurring with one another, such as "the value of consequences $C_1$ and $C_2$ are equal" or "the value of consequence $C_3$ is higher than value of consequence $C_4$". Those statements are translated into comparative constraints.

Definition 3.

Given an index-set I, a set of variables $S = \{x_i\}_{i \in I}$, a continuous function $g:S^n \rightarrow [0,1]$, and real numbers $a,b \in$

[0,1] with $a \leq b$, an interval constraint $g(x_1, \ldots, x_n) \in [a,b]$ is a pair of weak inequalities $g(x_1, \ldots, x_n) \geq a$ and $g(x_1, \ldots, x_n) \leq b$.

In this manner, equalities and inequalities are handled in a uniform way. There are three types of constraints and they correspond to different types of decision-maker statements.

Definition 4.

Given an index-set I, a set of variables $\{x_i\}_{i \in I}$ and real numbers $a,b \in [0,1]$ with $a \leq b$:

A range constraint is an interval constraint of the form $x_i \in [a, b]$ where $i \in I$ A comparative constraint is an interval constraint of the form $x_i - x_j \in [a, b]$ with $i,j \in I$ and $i \neq j$.

A normalization constraint is an interval constraint of the form $x_{h_1} + \ldots + x_{h_m} = k$ for $h_1, \ldots, h_m \in I$ and $h_i = h_j$ iff $i=j$.

A collection of interval constraints concerning the same set of variables is called a constraint set, and it forms the basis for the representation of decision situations.

Definition 5.

Given an index-set I and a set of variables $\{x_i\}_{i \in I}$, a constraint set in $\{x_i\}_{i \in I}$ is a set of interval constraints in $\{x_i\}_{i \in I}$.

The first procedure determines whether the elements in a constraint set are at all compatible with each other. This is the problem of whether a constraint set has a solution, i.e. if there exists any vector of real numbers that can be assigned to the variables.

Definition 6.

Given an index-set I and a set of variables $\{x_i\}_{i \in I}$, a constraint set X in $\{x_i\}_{i \in I}$ is consistent iff the system of weak inequalities in X has a solution. Otherwise, the constraint set is inconsistent. A constraint Z is consistent with a constraint set X iff the constraint set $\{Z\} \cup X$ is consistent.

In other words, a consistent constraint set is a set where the constraints are at least not contradictory. A computational procedure is required for determining whether a base is consistent or not. It is consistent if any solution can be found to the set of interval constraints. If the base is consistent, the orthogonal hull can be calculated. Thus, consistency is checked at the same time as the orthogonal hull is calculated.

In evaluating problems, it is necessary to find optima for given objective functions. The following definition introduces a shorthand notation for the max- and min-operators.

Definition 7.

Given an index-set I, a consistent constraint set X in $\{x_i\}_{i \in I}$ and a functions $f$, ${}^X\max(f(x)) =_{def} \sup(a \mid \{f(x) > a\} \cup X$ is consistent). Similarly, ${}^X\min(f(x)) =_{def} \inf(a \mid \{f(x) < a\} \cup X$ is consistent).

Definition 8.

Given an index-set I, a consistent constraint set X in $\{x_i\}_{i \in I}$ and a function $f$, ${}^X\text{argmax}(f(x))$ is a solution vector that is a solution to ${}^X\max(f(x))$, and ${}^X\text{argmin}(f(x))$ is a solution vector that is a solution to ${}^X\min(f(x))$.

Note that argmax and argmin need not be unique.

The orthogonal hull is a concept that in each dimension signals which parts of interval statements are incompatible with the constraint set. This is fed back to the decision maker.

Definition 9.

Given an index-set I and a consistent constraint set X in $\{x_i\}_{i \in I}$, the set of pairs $\{<{}^X\min(x_i),{}^X\max(x_i)>\}_{i \in I}$ of minima and maxima is the orthogonal hull of the constraint set and is denoted $<{}^X\min(x_i),{}^X\max(x_i)>_I$ The orthogonal hull can also be denoted upper and lower probabilities if X consists of probabilities and upper and lower values if X consists of values. In order to calculate the hull, it is necessary to find the pairs $<{}^X\min(x_i),{}^X\max(x_i)>$, i.e. finding minima and maxima for all variables in the base. All maxima and minima are found at the same time by the decision device using the following procedure.

Procedure 1.

To find $<{}^X\min(x_i),{}^X\max(x_i)>_I$ for all variables $x_i$, in indices from the index-set I, reformulate it into the optimization problem $${}^X\max \Sigma_i(x_i^+ - x_i^-)$$

where each $x_i$ is represented by the two variables $x_i^+$ and $x_i^-$.

The constraint set X' is derived from X in the following way (for any inequality operator ⊠):

Range Constraints:

An inequality $x_i \boxtimes k$ is transformed into a) $x_i^+ \boxtimes k$ and b) $x_i^- \boxtimes k$.

Comparative Constraints:

An inequality $x_i - x_j \boxtimes k$ is transformed into a) $x_i^+ - x_j^+ \boxtimes k$ and b) $x_i^- - x_j^- \boxtimes k$.

Normalization Constraints:

An equality $\Sigma_{i \in I}(x_i) = k$ is transformed into $\forall i \in I$: a) $x_i^+ - \Sigma_{j \neq i}(x_j^-) \geq k$ and b) $\Sigma_{j \neq i}(x_j^+) - x_i^- \leq k$.

The solution vector $(x_1^-, \ldots, x_n^-, x_1^+, \ldots, x_n^+) = {}^{X'}\text{argmax } \Sigma_i(x_i^+ - x_i^-)$ will then contain the upper and lower limits such that for each $x_i$ the pairs $<x_i^-, x_i^+>$ are the orthogonal hull components.

For convexity reasons, the entire interval between those extremal points is feasible. The procedure works regardless of the tree shape. Now, the decision device can display to the user, which statements are incompatible or which parts of intervals are not compatible with the rest of the statements. Hence, at all times, the decision device is capable of maintaining a consistent model of the user's problem in collaboration with the user.

Definition 10.

Given a constraint set X in $\{x_i\}_{i \in I}$ and the orthogonal hull $H = <a_i, b_i>_I$ of X, a focal point is a solution vector $(r_1, \ldots, r_n)$ with $a_i \leq r_i \leq b_i$, $\forall i \in I$.

Focal points can be chosen in several ways. The most important is to choose the centroids (mass points) of multivariate distributions (see Definition 25). The meaning of the focal point is the single most representative fixed numbers for each of the variables in the constraints in the constraint set. This is used in i.a. sensitivity analyses.

Bases

There are two types of bases, weight bases (criteria weights and event probabilities) and value bases.

Weight Bases

The smallest conceptual unit is the weight node base, which collects all weight statements made regarding a specific intermediate node in a tree.

Definition 11.

Given a tree $T = <I,N,E,r>$ and an intermediate node $n_i$, consider the index-set $C_i$ of disjoint and exhaustive children nodes. Then the weight node base $X_i$ is derived from a set of user range and comparative statements. The user constraints, together with the default constraints $$\sum_{k \in C_i} x_k = 1$$

and $\forall k \in C_i : x_k \in [0,1]$, form a weight node base with the following content.

An orthogonal hull $<a_k, b_k>$, $k \in C_i$ that represents the user and default range constraints.

All user comparative statements.

The normalization constraint $$\sum_{k \in C_i} x_k = 1.$$

Thus, the base transforms statements into constraints while maintaining the same meaning. A base is more suitable for the decision device to handle. The next aggregation level is that of a weight base, which collects together all weight statements (be it criteria weights or event probabilities) belonging to all nodes in the same tree.

Definition 12.

Given a tree $T=<I,N,E,r>$ with an index-set $I^I$, and all intermediate nodes $n_i$, $i \in I^I$. Then the weight base X is the collection of all weight node bases $X_j$ combined, i.e.

$$X = \bigcup_{j \in I^I} X_j$$

of orthogonal hulls, normalizations, and user comparative statements.

These bases are used for criteria weights.

Probability Bases

Probability bases are similar to weight bases. For events, they are assigned probabilities of occurring. These probabilities are handled as weights. Thus, an event base is a collection of probability constraints for a specific event (intermediate node).

Definition 13.

Given a tree $T=<I,N,E,r>$ and an event node $n_i$, consider the index-set $C_i$ of disjoint and exhaustive consequences of the event, event user statements in $\{p_j\}_{j \in C_i}$, and a discrete, finite probability mass function $\Pi: n_j \rightarrow [0,1]$ over $\{p_j\}_{j \in C_i}$. Let $p_j$ denote the function value $\Pi(n_j)$. $\Pi$ obeys the standard probability axioms, and thus $p_j \in [0,1]$ and $\Sigma_j p_j = 1$ are default constraints. This weight node base is called an event base.

Thus, an event base is characterizing a set of discrete probability distributions. As with weight bases in general, the next aggregation level is that of a probability base, which collects together all weight statements (be it criteria weights or event probabilities) belonging to all nodes in the same tree.

Definition 14.

Given a tree $T=<I,N,E,r>$ with all intermediate nodes $n_i$, $i \in I^I$. Then the probability base P is all event bases $P_j$ combined, i.e.

$$P = \bigcup_{j \in I^I} P_j$$

of orthogonal hulls, normalizations, and user comparative statements.

Value Bases

Requirements similar to those for probability variables are found for value variables. There are apparent similarities between weight and value statements but there are differences as well. The normalization ($\Sigma_k x_{ik} = 1$) requires the weight variables of an intermediate node to sum to one. No similar constraint exists for the value variables.

Definition 15.

Given a tree $T=<I,N,E,r>$, consider the set $N^L$ of leaf nodes. Then a value base is derived from the set of user range and comparative statements. The user statements, together with the default constraints $\forall k \in I^L : v_k \in [0,1]$, form the base constraints in the following way.

An orthogonal hull $<a_k, b_k>$, $k \in I^L$ that represents the user and default range constraints.

All user comparative statements.

Similar to weight bases, a value base is characterizing a set of value functions.

Definition 16.

Given a tree $T=<I,N,E,r>$, a value base V, and a level constant $a \in [0,1]$, consider the set $N^L$ of leaf nodes. Then a security base $S(V,a)$ in the variables $\{s_i\}$ is derived from the value base $$\forall k \in I^L, s_k = \begin{cases} 0 & \text{if } \{v_k < a\} \cup V \text{ is inconsistent} \\ 1 & \text{if } \{v_k < a\} \cup V \text{ is consistent} \end{cases}.$$

V in the following way.

Note that, in the sequel, for simplicity there is not made a distinction between a base and its content (the constraints) unless it is necessary for understanding the presentation.

Belief Distributions

Figure 11:
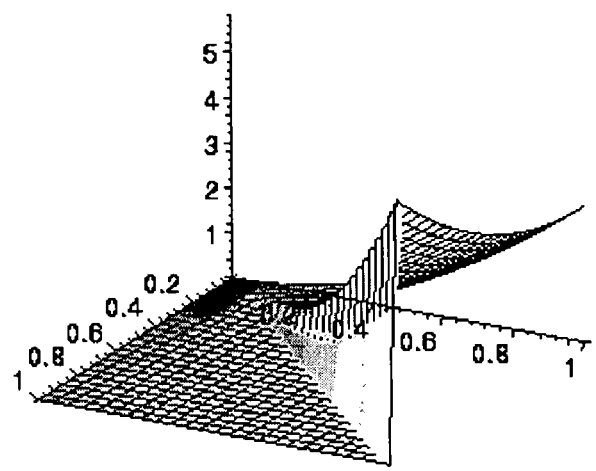
FIG. 11 shows a distribution over a two-dimensional base.

The weight, probability and value estimates as discussed above are expressed by weight functions, probability distributions and value functions. To enable a differentiation of functions, second order estimates (such as belief distributions) can be defined over multi-dimensional spaces, where each dimension corresponds to, for instance, possible weights, probabilities, or values of consequences. By this, the distributions can be used to express differing strengths of belief in different vectors in the polytopes that are solution sets to the bases. As an example, FIG. 11 shows a belief distribution over a two-dimensional space.

More formally, the solution set to a probability or value base is a subset of a unit cube. This subset can be represented by the support of a distribution over the cube.

Definition 17.

Let a unit cube be represented by $B=(b_i, \ldots, b_k)$. The $b_i$ are written out to make the labels of the dimensions clearer. More rigorously, the unit cube should be represented by $[0,1]^k$. For the same reason, a cube is sometimes denoted using variables $p_{ij}$ and $v_{ij}$.

Definition 18.

A belief distribution over B is a positive distribution g defined on the unit cube B such that $\int g(x)dV_B(x)=1$, where $V_B$ is some k-dimensional Lebesque measure on B. The set of all belief distributions over B is denoted BD(B).

Decision Structures

Using the above concepts of constraint and base, a decision situation is modelled by a decision frame. To begin with, each alternative under each criterion is represented in the decision device by a tree frame.

Each alternative under each criterion is represented by a tree frame.

Definition 19.

Given a decision alternative, statements are made about the probabilities of the events as well as values of the consequences. A tree frame is a structure <T,P,V,Γ> containing the following representation of the alternative:

A rooted tree T=<I,N,E,r> with index-set partitions $I^I$ and $I^L$, and, for each i ∈ $I^I$, the child index-set $C_i$.

A consistent probability base P in variables $\{p_i\}$, i ∈ I\{r}, representing all probability statements in the form of constraints.

A consistent value base V in variables $\{v_i\}$, i ∈ $I^L$, representing all value statements in the form of constraints.

A belief distribution Γ over the solution sets to P and V.

The decision device models all alternatives under all criteria in the same structure. This structure (the decision frame) contains the full representation of the entire decision problem, and all evaluations are made relative to it.

The probability, value and weight bases together with structural information constitute the decision frame.

Definition 20.

Given a multi-criteria decision situation with c criteria ($K_1$, . . . ,$K_c$) in a tree $T_0$ (called a weight tree) and with m alternatives. A decision frame is a structure <$T_0$,W,Ω,m,c,F>, F=$\{F_{ik}\}$ for all ik ∈ {1, . . . ,m}×{1 , . . . ,c}, where $F_{ik}$=<$T_{ik}$,$P_{ik}$, $V_{ik}$,$\Gamma_{ik}$> is a tree frame for alternative $A_i$ under criterion k. The decision frame contains the following representation of the situation:

A weight tree $T_0$ with c criteria $K_i$ each being represented by a leaf node.

A consistent criteria weight base W in variables $\{w_i\}$, i ∈ $I_0^L$, representing all criteria weight statements in the form of constraints.

For each criterion, a tree frame $F_{ik}$ for each alternative.

A belief distribution Ω over the solution set to W.

This means that a decision frame can be seen as a generalised decision tree together with a set of bases and belief distributions.

Note that sub-decisions (i.e. local decisions within a criterion) can easily be modelled in the decision frame in Definition 20 by assigning the sub-decision to an event node. Then, the outcomes of the event become courses of action in the sub-decision. The probabilities of the edges from an event node representing a sub-alternative not chosen are set to 0 and the probability of the edge from the event node representing a sub-alternative chosen is set to 1. Hence, all definitions and procedures in this invention apply to decisions containing sub-decisions as well. Except for the main decision (at the root node), we can handle all sub-decisions formally as probability events.

When all statements in the current state of the problem have been entered, the data entry phase is over for the time being. As the insights into the decision problem accumulate during all the following phases, it is possible to add new information and alter or delete information already entered. This stepwise procedure is iterated as necessary.

Evaluation

One of the main purposes of modelling the user's information in a decision frame is for the decision device to be able to evaluate the available decision alternatives. In order to do this, the alternatives are evaluated primarily using the expected value, first under each criterion and then for all criteria weighted together using the weight tree in the decision frame. The principle of maximizing the expected value is complemented by other, supplementary decision rules such as security levels.

The first concept to consider for a decision device is the weighted value of a tree, be it criteria weights or event probabilities.

Definition 21.

Given a tree frame <T,X,Y,Γ>, T=<I,N,E,r>, where X contains constraints in variables $\{x_i\}$, i ∈ I\{r} and Y contains constraints in variables $\{y_j\}$, j ∈ $I^L$ the weighted value $G_i(T)$ of an intermediate node $n_i$ in T is $$G_i(T) = \begin{cases} y_i, & i \in I^L \\ \sum_{k \in C_i} (x_k \cdot G_k(T)), & i \in I^I \end{cases}.$$

The weighted value of the tree is $G_r(T)$, i.e. the weighted value of the root node $n_r$.

Definition 22.

Given a tree T=<I,N,E,r>, a weight base X containing constraints in variables $\{x_i\}$ and a set D=$\{d_i\}$ of constants, the weighted value $G_i(T,D)$ of an intermediate node $n_i$ in T is $$G_i(T, D) = \begin{cases} d_i, & i \in I^L \\ \sum_{k \in C_i} (x_k \cdot G_k(T, D)), & i \in I^I \end{cases}.$$

The weighted value of the tree is $G_r(T,D)$, i.e. the weighted value of the root node $n_r$.

Note that the weighted value $G_i(T)$ and the weighted value $G_i(T,D)$ are different definitions.

The decision device is able to obtain the maximum of the weighted expected values in the decision tree. This is done through a set of procedures, which obtains components of the weighted expected values in units of increasing aggregation up to Procedure 6, which obtains the weighted expected values of the entire decision frame.

Procedure 2.

Given a set D=$\{d_i\}$, i ∈ {1, . . . ,n}, of n constants and a base X in n variables $\{x_i\}$, i ∈ {1, . . . ,n}, without comparative constraints, $$^x\max \sum_{j \in C_i} (d_j \cdot x_j)$$

is found as follows: Re-index $\{d_i\}$ such that $\forall\ d_i, d_j \in D$, $d_i \geq d_j$ if $i<j$. Then $$^x\max \sum_{j=1}^{n'} (d_j \cdot x_j) = \sum_{j=1}^{n} d_j \cdot a_j,$$

where $a_k = {}^x\max(x_k)$ and $X^k$ is $X \cup \{x_{k-1}=a_{k-1}\} \cup \ldots \cup \{x_l=a_l\}$.

Procedure 3.

Given a set $\{d_i\}$, $i \in \{1, \ldots, n\}$, of n constants and a base X with n variables $\{x_i\}$, $i \in \{1, \ldots, n\}$, $$^x\max \sum_{j \in C_i} (d_j \cdot x_j)$$

is found in one of two ways.

3A: If there are comparative constraints in X, $$^x\max \sum_{j \in C_i} (d_j \cdot x_j)$$

is found by an ordinary LP algorithm such as Simplex.

3B: If there are no comparative constraints in X, $$^x\max \sum_{j \in C_i} (d_j \cdot x_j)$$

is found by Procedure 2.

Procedure 4.

Given a tree $T=<I,N,E,r>$, a weight base X and a set $D=\{d_i\}$, $i \in I^L$, of constants. Then $^x\max\ G(T,D) =_{def} {}^x\max G_r(T,D)$. $^x\max G_i(T,D)$ is found by $$^x\max G_i(T,D) = \begin{cases} d_i, & i \in I^L \\ ^x\max \sum_{k \in C_i} (x_j \cdot G_j(T,D)), & i \in I^I \end{cases}.$$

Note that because of independence between X and D, for any $i \in I^I$ $$^x\max \sum_{j \in C_i} (x_j \cdot G_j(T,D)) = {}^x\max \sum_{j \in C_i} (x_j \cdot = {}^x\max G_j(T,D)),$$

where first $r_j = {}^x\max G_j(T,D))$ is found by Procedure 4, and then $$^x\max \sum_{j \in C_i} (x_j \cdot r_j)$$

is found by Procedure 3 (after re-indexing).

Procedure 5.

Given a tree frame $<T,X,Y,\Gamma>$, with a tree $T=<I,N,E,r>$, denote the orthogonal hull for Y $<a_i,b_i>_I^L$. Let XY be $X \cup Y$, the collection of all constraints in the two bases X and Y. Then $^{XY}\max G(T) = {}^x\max G(T,\{b_i\})$, $i \in I^L$. $^x\max G(T,\{b_i\})$ is found by Procedure 4.

Procedure 6.

Given a decision frame $<T_0, W,\Omega,m,c,F>$, with $F=\{F_{ik}\}$ for all $ik \in \{1, \ldots, m\} \times \{1, \ldots, c\}$, where $F_{ik}=<T_{ik},P_{ik},V_{ik},\Gamma_{ik}>$ is the tree frame for alternative $A_i$ under criterion k. Let $$P_k = \bigcup_{i=1}^{m} P_{ik}$$

and $$V_k = \bigcup_{i=1}^{m} V_{ik}.$$

The maximum of the function $f(\cdot)$ of weighted expected values is $^W\max G(T_0,\{r_k\})$, where $\forall\ k \in I_0^L$, $r_k = {}^{P_k V_k}\max f(\{G(T_{ik})\})$, $i \in \mathring{A}$, $\mathring{A} \subseteq \{1, \ldots, m\}$. Because of separability, $r_k = f(\{^{P_{ik} V_{ik}}\max G(T_{ik})\})$. Each $r_k$ is found by Procedure 5. Then $^W\max G(T_0, \{r_k\})$ is found by Procedure 4.

All the maximizing procedures above are likewise applicable to minimizing operations by means of changing the sign of the objective function. Thus, upper and lower bounds are obtained.

There are several functions $f(\cdot)$ that are important for a decision device to calculate. Among others, apart from the weighted expected value $H_i$ of an alternative $A_i$ (i.e. $f(\{G(T_{ik})\})=G(T_{is})$ for each index pair is), $\delta_{ij}$ denotes the difference in weighted expected values $H_i-H_j$ between two alternatives $A_i$ and $A_j$, and $\gamma_i$ denotes the expression $$H_i - \frac{1}{m-1} \sum_{k \neq i} H_k$$

for m alternatives. $\delta_{ij}$ is the pair-wise comparison of alternatives and $\gamma_i$ is a total ranking of all alternatives. These results are displayed to the user (if human, see FIG. 1) or sent to the agent or similar (if non-human).

Supplementary Rules

There are several supplementary rules to the rule of maximizing the expected value. One such class of rules is security levels. They remove alternatives that are too risky to pursue from an end-result point of view, i.e. the outcome might, with a possibly low probability in one or more criteria, be unacceptable. Those alternatives are filtered out regardless of having a plausible expected value. Procedure 7 is the security level procedure, in which the filter is obtained by a transformation of the value base.

Procedure 7.

In Procedure 6, use security bases $S(V_{ij},a)$ instead of value bases $V_{ij}$. Then the procedure obtains the maximum insecurity at value level $a \in [0,1]$ for the desired function $f(\cdot)$.

The result of a security filtering is communicated to the user, and is also subject to the same sensitivity analyses that apply to maximizing the expected value.

The decision device is thus able to, in interaction with the user, find the most qualified alternatives if there is enough information for them to be found. During the process, the decision device is able to direct the gathering of information by showing, using sensitivity analyses, which parts of the incomplete information needs to be improved the most by indicating the relative influence over the final evaluation results.

Local Belief Distributions

The $\Gamma$- and $\Omega$-distributions in a decision frame expresses the qualification of beliefs in different values in the solution sets of the bases. However, the only information at hand in a decision situation is, in practice, local over a subset of variables (i.e. of lower dimension), because most decision makers have no access to, or perception of, the belief distributions over the entire decision frame at the same time. Therefore, the relationship between belief distributions over entire bases and over local ones, i.e., what do beliefs over some subset of a unit cube mean with respect to beliefs over the entire cube, form the basis for S-projections.

Definition 23.

Let $B=(b_1, \ldots, b_k)$ and $A=(b_{i_1}, \ldots, b_{i_s})$, $i_j \in \{1, \ldots k\}$ be unit cubes. Furthermore, let $F \in BD(B)$, and let $$f_A(x) = \int_{B-A} F(x) dV_{B-A}(x).$$

is an S-projection of F on A. This projection is denoted $f_A = Pr_A(F)$.

An S-projection of a belief distribution is also a belief distribution. A special case is when belief distributions over the axes of a unit cube B are S-projections of a belief distribution over B.

Definition 24.

Let a unit cube $B=(b_1, \ldots, b_k)$ and $F \in BD(B)$ be given. Then $f_i(x_i) = \int F(x) dV_{B_{i_{si}}}(x)$, where $B_i^- = (b_1, \ldots, b_{i-1}, b_{i+1}, \ldots, b_k)$ is a belief distribution over the axis $b_i$. The result of such a projection will be referred to as a local distribution.

In the decision device, the decision maker has two options. Either to explicitly enter the varying belief in all the different parts of the intervals, or to omit it, in which case the belief can be regarded as implicitly uniform (or another distribution depending on the decision situation) over the entire feasible intervals. The procedures and analyses that follow are the same in both cases. In this presentation, whenever uniform distributions are used, this should not be delimiting in any respect.

Centroids

Intuitively, the centroid of a distribution is a point in space where some of the geometrical properties of the distribution can be regarded as concentrated.

Definition 25.

Given a belief distribution F over a cube B, the centroid $F_c$ of F is $F_c = \int xF(x)dV_B(x)$, where $V_B$ is some k-dimensional Lebesque measure on B. Centroids are invariant under projections on subsets of the unit cubes in the sense that the S-projections of a centroid on a subset have the same coordinates as the centroids of the corresponding S-projections. Thus, a local distribution of a belief distribution preserves the centroid in that dimension.

Uniform Distributions

Uniform distributions could arise either as the decision maker explicitly enters them or as the decision maker omits information on belief distributions. The local distribution of a uniform distribution over the surface $$\sum_{i=1}^{n} x_i = 1$$

in a cube $B=(b_1, \ldots, b_k)$, is a polynomial of degree n−2, where n is the dimension of B. This means that the local distributions resulting of a belief distribution over a base with 3 nodes are of degree 1. Similarly, the local distributions resulting from a distribution over a base with 4 nodes are of degree 2, etc. In general, the intervals are of the type [a, b], where a and b usually are real numbers in [0, 1]. However, for presentational purposes, without any loss of generality, the intervals are [0, 1], i.e., a=0 and b=1.

Figure 12:
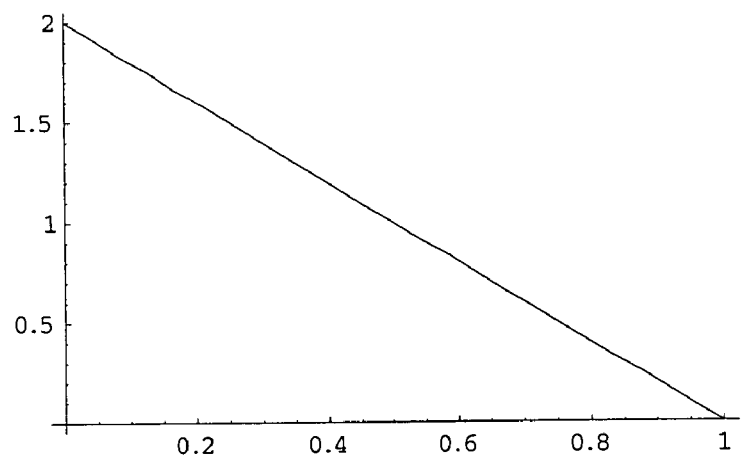
FIG. 12 shows the aggregated projection of the axes when n=3.

For instance, the S-projection $f(x_i)$ on the axes when n=3, is $2-2x_i$, i.e., $$f(x_i) = \int_0^{1-x_i} \frac{2}{\sqrt{3}} \sqrt{3} \, dy = 2(1 - x_i),$$

see FIG. 12. The centroid of this distribution is $$f_c = \int_0^1 x_i 2(1 - x_i) dx_i = \frac{1}{3}.$$

Another example is the local distribution $f(x_i)$ of a uniform distribution over the surface $$\sum_{i=1}^{n} x_i = 1$$

in a 4-dimensional cube, with centroid ¼:

$$f(x_i) = \int_0^{1-x_i} \int_0^{1-y-x_i} 6 \, dz \, dy = 3(1 - 2x_i + x_i^2) = 3(1 - x_i)^2.$$

Figure 13:
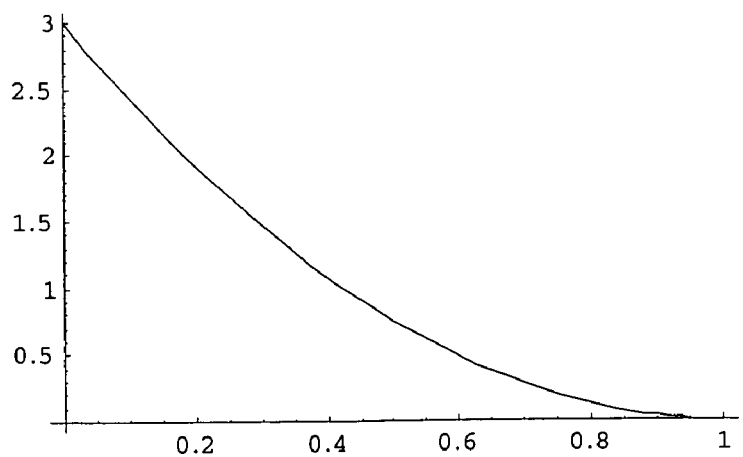
FIG. 13 shows the projection of the axes when n=4, with centroid ¼.

See FIG. 13.

This can be stated more generally. Let F be a uniform distribution over the surface $$\sum_{i=1}^{n} x_i = 1$$

in a cube B=(b$_1$, . . . ,b$_n$) and let $f(x_i)$ be the local distribution of F on b$_i$. Then $$f(x_i) = \int_{B_i^-} dV_{B_i^-}(x) = (n-1)(1-x_i)^{n-2}.$$

The centroid of $f(x_i)$ is $$f_c = \int_0^1 x_i f(x_i) dx_i = \frac{1}{n^2}.$$

Considering a probability base, when asserting a set of interval probability statements without further second-order qualification, one interpretation is that a decision maker believes equally in all feasible points with respect to the probability assertions (the orthogonal hull), i.e., the solution set that is represented by a uniform distribution over the probability base. However, the constraint $$\sum_{i=1}^{n} x_i = 1$$

must be satisfied in the base, since it is not possible to believe in an inconsistent point such as [10%, 30%, 50%, 40%]. Consequently, the local distributions are as above.

For the same reason, in the case of uniform distributions over bases without constraints of the type $$\sum_{i=1}^{n} x_i = 1,$$

such as value bases, the local distributions are uniform as well.

Procedure for Beliefs

The expected value of the alternatives, represented by a classical decision tree, are straight-forwardly calculated when all components are numerically precise. When the domains of the x$_{ij}$'s are solution sets to probability and value bases, this is not as straightforward. For interval assignments, the default could be to assume that the beliefs in the feasible values are uniformly distributed.

Let G be a belief distribution over the two cubes A and B. Assuming that G has a positive support on the feasible probabilities at level i in a decision tree, i.e., is representing these (the support of G in cube A), as well as the feasible probabilities of the children of a node x$_{ij}$, i.e., x$_{ij1}$, x$_{ij2}$, . . . ,x$_{ijm}$ (the support of G in cube B). Let $f$=Pr$_A$(G) and g=Pr$_B$(G). Then the functions $f$ and g are belief distributions. Furthermore, there are no relations between the probabilities on different levels so the distributions $f$ and g are independent.

Consequently, the invention contains the following procedure for determining the distribution over the product of the distributions $f$ and g. Informally, it is applied to the beliefs in x and y by multiplication and then added for all for all values z=x·y. Similarly, the addition of values with belief distributions defined over them means that the beliefs in x and y are multiplied and then added for all for all values z=x+y.

Definition 26.

The product of two belief distributions $f(x)$ and g(x) is h(z)=∫$f(x)$·g(y)ds, where Γ$_z$={(x,y):x·y=z} and 0≦z≦1.

Figure 14:
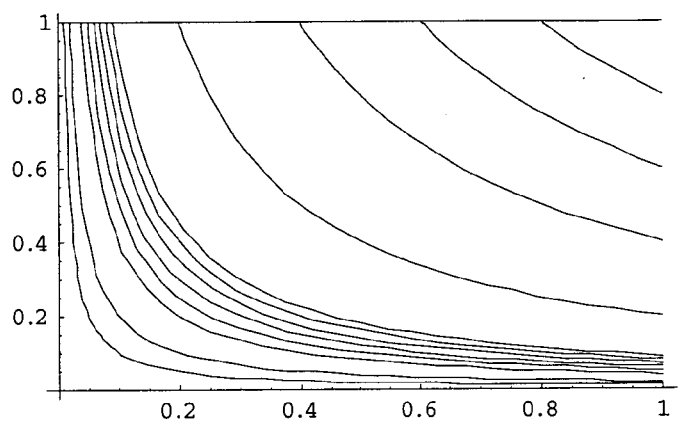
FIG. 14 shows some instances of values of z for line integration.

FIG. 14 shows some instances of the integration domain Γ$_z$.

Definition 27.

The sum of two belief distributions $f(x)$ and g(x) is h(z)=∫$f(x)$·g(y)ds, where Γ$_z$={z:z=x+y} and 0≦z≦1.

Let A and B be cubes and let G be a belief distribution over A×B. Let $f(x)$=Pr$_A$(G(z)) and g(y)=Pr$_B$(G(z)). The product of $f(x)$ and g(y) is a belief distribution.

Furthermore, the centroid h$_c$ of h(z) always satisfies h$_c$=$f_c$·g$_c$, where $f_c$ and g$_c$ are the centroids of $f$ and g respectively.

Distributions in Trees and Networks

Evaluating a result, e.g., the expected value, by aggregating probabilities and values in a tree according to Definition 26 and Definition 27, there are two main cases for the procedures of a decision device to consider.

The constraints can be linearly independent as in a value base without equality statements (independent base).

The other case is in a weight or probability base, when the weights or probabilities of node sum up to 1 (dependent base).

In the independent case, the distributions over the intervals could be considered to be uniform over the respective axes' intervals.

Uniform Distributions in an Independent Base

Assume a base where the constraints are linearly independent. If the assertions are made through intervals, then the belief in all feasible points are equal, i.e., the component distributions are constant, $f(x)$=g(y)=1, on the intervals [0,1]. Then, the line integral in Definition 26 results in $$h(z) = \int_z^1 \frac{1}{x} dx = -\text{Log}(z).$$

Subsequent multiplications of uniform distributions over intervals [0,1] results in Log(z)/2 when three functions are multiplied, etc. This is stated generally as:

Let $f_1(x_1)$=1, . . . , $f_m(x_m)$=1 be belief distributions over the intervals [0,1] and let Γ$_i$={(x$_i$,x$_{i-1}$): x$_i$x$_{i-1}$=z$_i$}. The distribution h$_m$(z$_m$) is the distribution over m factors, $$h_m(z_m) = \frac{(-1^{m-1})(\text{Log}(z))^{m-1}}{(m-1)!}.$$

Figure 15:
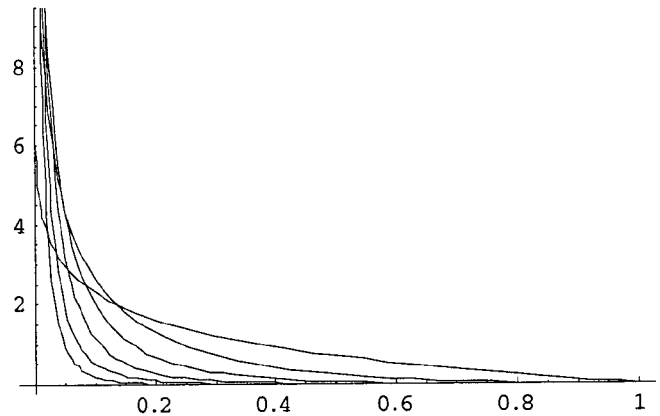
FIG. 15 shows the results of multiplication of distributions of 2, 3, 4, 5, 6, and 7 consecutive node values, i.e.

FIG. 15 shows the plots of the functions on depths 2 to 7.

The centroid (mass) of the resulting belief distributions become more shifted towards the lower values, the more factors that are involved. Already after one multiplication, this effect is significant. From initially uniform distributions, the resulting distribution has entirely different properties.

The resulting distribution still has a support on the entire interval [0,1], but the relative belief in the feasible points is warped.

This tendency is confirmed when considering the behaviour of the centroid. The centroid of the distribution $h_m(z_m)$ is $$\int_0^1 z \frac{(-1^{m-1})(\text{Log}(z))^{m-1}}{(m-1)!} dz = 2^{-m}.$$

The decision device uses the centroid as its focal point, displaying how it warps in repeated multiplications.

Uniform Distributions over Dependent Bases

A local base is a node base where all the labels are children of the same node. When only linear constraints are given, a belief function $F(x_1, x_2, \ldots, x_n)$ could be assumed to be uniform over the local node bases. The projections of a uniform distribution over a probability base, without other constraints other than the default ones, are polynomials of degree n−2 with centroids 1/n.

Let $F(x_1, x_2, x_3, x_4, x_5, x_6)$ be uniform over the surfaces $x_1+x_2+x_3=1$ in a cube A and $x_4+x_5+x_6=1$ in a cube B. Let $f(x)=\text{Pr}_A(F)$ and $g(y)=\text{Pr}_B(F)$. Assuming that y=z/x, Definition 26 yields $$h(z) = \int_z^1 2(1-x) \cdot 2\left(1 - \frac{z}{x}\right) \cdot \frac{1}{x} dx$$
$$= -4(2 - 2z + \text{Log}(z) + z \cdot \text{Log}(z)),$$

with centroid at 1/9. See FIG. 16.

One more multiplication results in the centroid 1/27 and the graph $-4 \cdot (-12 + 12z - 6 \text{Log}(z) - 6z \cdot \text{Log}(z) - \text{Log}(z)^2 + z \cdot \text{Log}(z)^2)$. See FIG. 17.

Generally, given m distributions over the surfaces $$\sum_{i=1}^{n_1} x_i = 1$$

in cubes $B_i=(b_1, \ldots, b_{n_i})$ the centroid of $f(z)$ is $$\int_0^1 z f(z) dz = \frac{1}{n_1 n_2 \ldots n_m}.$$

This means, for instance, that having a 4-ary tree of depth 3, the resulting distribution becomes $27/2(24(z-1)^2 - 9(z^2-1) \text{Log}(z) - (z^2+8z-1) \text{Log}(z)^2)$ with a centroid $1/4^3 = 1/64$.

See FIG. 18. The orthogonal hull components are <0,1>, and in order to inform the decision maker that nearly all belief is concentrated close to the lower bound, the centroid is used.

Procedure for Determining Belief Distribution

The mass of the resulting belief distributions becomes more warped towards the lowest values the deeper the tree is (multiplication) and the more factors are aggregated (addition) in the expected value.

The tendency of the centroid (mass) to aggregate close to the minimum value above dictates how the decision device handles interval multiplication. The resulting belief is much more concentrated to the left (lower bound) than what pure interval calculations suggest. Addition yields similar tendencies, but towards the centroid instead.

The aggregated distribution of the expected value, i.e., a sum of products, is very different from its components. The most important sub-intervals are the supports of the distributions where most mass is concentrated.

This can, e.g., be seen from FIG. 16, where about 95% of the mass is concentrated in the interval [0, 0.38]. Similarly, 95% of the mass is concentrated in the interval [0, 0.15] and [0, 0.07] in FIG. 17 and FIG. 18, respectively. This can be compared to the effects of pure interval boundary calculations, which would generate a resulting interval [0, 1].

Definition 28.

Let $f(x)$ and $g(y)$ be two belief distributions over the two one-dimensional cubes A and B, let h(z) be the sum or product of these and let Supp(F) be the support of a belief distribution F. Denote $\max(\text{Supp}(f))=x_{MAX}$ and $\min(\text{Supp}(f))=x_{MIN}$ as well as $\max(\text{Supp}(g))=y_{MAX}$ and $\min(\text{Supp}(g))=y_{MIN}$.

Then define:

$$\text{Int}_\alpha f(x) = \left\{(a, b): \int_a^b f(x) dx \geq \alpha \right\},$$

where $\alpha \in [0,1]$ $\text{Len}_\alpha f(x)=g(a,b)$ for some function g with the domain $\text{Int}_\alpha(f(x))$.

One important instance of the latter is:

$$\text{Len}_\alpha f(x) = \min(b - a): \int_a^b f(x) dx \geq \alpha,$$

where $\alpha \in [0,1]$ $\text{Pr op}_\alpha f(x) = \text{Len}_\alpha f(x)/(x_{MAX} - x_{MIN})$ and analogously for g(y) and h(z).

One important observation is that it generally follows that:

Pr $\text{op}_\alpha h(z) << $ Pr $\text{op}_\alpha f(x)$

Pr $\text{op}_\alpha h(z) << $ Pr $\text{op}_\alpha g(y)$

This means that the main parts of the distributions usually are contained in a narrower interval compared with the intervals from the possible extreme points. The decision device keeps track of this warp. The procedure for sensitivity analyses varies the parameter $\alpha$ depending of how much mass of the belief distribution a decision maker wants to take into consideration. By varying a and b above, a method for checking the sensitivity is obtained even if $f(x)$ and $g(y)$ are not explicitly provided.

The results of an evaluation are subject to generalized sensitivity and stability analyses to be carried out in a large number of dimensions at the same time. This is done by determining the stability of the relation between the consequence sets under consideration by considering values far from the centroid as being less reliable than the closer ones due to the former being less supported. The device performs sensitivity analyses and stability analyses in at least four ways. Apart from traditional analyses, this is done by contractions, by generalized critical value checks (such as for example generalized tornado diagrams) and by belief mass proportions (such as $\text{Prop}_\alpha h(z)$).

The decision device handles the expected value and supplementary information such as security levels in two ways. First, the boundary values are communicated (the interval endpoints). Second, the sub-intervals around the centroid representing the main belief are communicated, along with means of manipulating the widths of the sub-intervals through specifying varying amounts of mass inclusion (belief cut).

The set of sensitivity procedures is motivated by the difficulties of performing simultaneous sensitivity analysis in several dimensions at the same time. It is hard to gain real understanding of the solutions to large decision problems using only low-dimensional analyses. Investigating all possible such combinations leads to a procedure of high combinatorial complexity in the number of cases to investigate. Using belief cuts, such difficulties are circumvented. The belief cut avoids the complexity inherent in combinatorial analyses. Consequently, a belief cut can be regarded as a focus parameter that zooms in on the centroid. An alternative that has its upper expected value bound below another alternative's lower expected value bound is dominated.

If the decision maker agrees that a problem cut at the cut level where dominance starts occurring still reflects his decision situation, then that dominated alternative can also be excluded from further analysis. This depends on the decision situation, whether the decision maker is a human or a machine, and whether the aim is to make an ultimate decision or (common for humans) to gain a better understanding of the decision problem. Also, for group decisions, the alternatives should be considered relative to compromises recorded.

The types of problems that can be analyzed using the method and device as described herein are of various kinds from several different classes of activities. Some of the main features are to:

Identify the best possible course of action given available information

Minimize and avoid undesirable risk taking

Easier interpret and analyze decision alternatives and risks

Save time through a more efficient risk and decision process and resource allocation Handle experts with differing opinions Obtain transparency in the risk and decision processes Reach consensus in a decision making group Adapt to changes and new regulations Learn about decision analysis through a pedagogical and user friendly way of working Application areas are essentially all areas containing decision situations, which are possible to model as decision trees as featured in this invention and where the cost of obtaining information is reasonable compared to the cost of making a non-optimal decision. Some non-delimiting examples of application areas are:

Security analysis of process and control systems

Choice of supplier of equipment

Choice of effective forms of medical treatment

Risk management regarding evaluation of costs

Choice of supporting system for various business activities

Company mergers and acquisitions

Choice of insurance strategies and policies

Analysis of forecasts

Having described the invention above in a preferred embodiment thereof, it is feasible to modify the invention in various ways. We include all modifications and similar embodiments coming within the spirit or the scope of the invention.

We claim:

1. A computer system for decision making in a decision situation, the computer system comprising:
   an input unit for receiving data corresponding to weights and/or probabilities and values for a decision situation that can be represented in a generalized decision tree with criteria and probabilistic events in the same tree;
   a modeling unit for modeling the decision situation using at least one of a probabilistic decision model or a multi-criteria decision making model, where at least one of the probabilistic decision model or the multi-criteria decision making model is modeled in more than one level for generation of a decision frame, where the decision frame is a format storing information on interval event probabilities, interval criteria weights, interval utility values, and decision trees;
   a unit for evaluating the decision frame using input data fed through the input unit; and
   an output unit for outputting a decision prediction based on said decision frame evaluation.

2. The system of claim 1, wherein the modeling unit is designed to apply the same format to model a criteria hierarchy and a probabilistic decision tree.

3. The system of claim 1, wherein the modeling unit is designed to model the decision situation with a combination of a probabilistic decision model and a multi-criteria decision making model and where the multi-criteria decision making model is modeled in more than one level.

4. The system of claim 1, further comprising a unit for storing belief distributions in the decision frame and calculating the aggregated belief of a weighted expected value by means of a distribution of a sum of products, where the product of two belief distributions $f(x)$ and $g(x)$ is $$h(z) = \int_{\Gamma_z} f(x) \cdot g(y) ds,$$

where $\Gamma_z = \{(x,y): x \cdot y = z\}$ and $0 \leq z \leq 1$ and the sum of two belief distributions $f(x)$ and $g(x)$ is $$h(z) = \int_{\Gamma_z} f(x) \cdot g(y) ds,$$

where $\Gamma_z = \{z: z = x + y\}$ and $0 \leq z \leq 1$.

5. The system of claim 1, wherein the input unit is designed to check consistency and determining the orthogonal hull as upper and lower bounds of the variables $(x_i)$ in the decision frame, wherein the decision frame is found to be consistent if upper and lower bounds are found and the upper bounds $(\max(x_i))$ and lower bounds $(\min(x_i))$ are found simultaneously by solving the optimization problem max $\Sigma_i(x_i^+ - x_i^-)$ with a new constraint set formed from the decision frame, and wherein each variable $x_i$ is represented by the two variables $x_i^{+and}$ $x_i^-$ and the new constraint set is derived from the original in the decision frame by transforming, for an inequality operator $\bowtie$,
   an inequality $x_i \bowtie k$ into a) $x_i^+ \bowtie k$ and b) $x_i^- \bowtie k$,
   an inequality $x_i - x_j \bowtie k$ into a) $x_i^+ - x_j^- \bowtie k$ and b) $x_i^- - x_j^+ \bowtie k$, and
   an equality $\Sigma_{i \in I}(x_i) = k$ into $\forall i \in I$: a) $x_i^+ - \Sigma_{j \neq i(xj)}^- \geq k$ and b) $\Sigma_{j \neq i}(x_j^-) - x_i^- \leq k$, whereby a solution vector to max $\Sigma_i(x_i^+ - x_i^-)$ will contain the upper and lower bounds.

6. The system of claim 1, further comprising a sensitivity analysis unit for performing a sensitivity analysis of the possible outcomes.

7. The system of claim 6, further comprising a unit for storing belief distributions in the decision frame and where the measure for the analysis is $Len_\alpha f(x)=g(a,b)$ for a function g with the domain $Int_\alpha f(x)$, where $$Int_\alpha f(x) = \left\{(a,b): \int_a^b f(x)dx \geq \alpha\right\},$$

and where $\alpha \in [0,1]$ and $f(x)$ is a belief distribution.

8. The system of claim 1, further comprising a critical value check unit by instantiating a subset of the total of variables and varying the remaining variables.

9. The system of claim 1, further comprising a calculation unit for obtaining the upper and lower bounds of a weighted expected value of an alternative being the value of end nodes in the combined multi-criteria and probability tree multiplied with criteria weights and probabilities, a difference in weighted expected values between two alternatives, and a difference in weighted expected values between an alternative and an average of other alternatives in the decision frame, the calculation unit operative to find the maximum expected value function of each alternative under each criterion in the decision frame and to calculate the desired weighted expected value function by a maximization of the weighted expected value functions of each alternative under each criterion, wherein the maximum expected value function of an alternative under a criterion is a function of the maximum expected value for the alternative under the respective criterion, wherein the maximum expected value of an alternative under a criterion in the decision frame is calculated by substituting the value variables with the upper value hull of the value variables and solving the resulting maximization problem for the root node of the tree, and wherein the maximum expected value of a node in the tree is calculated using the upper value hull of the value variable if the node is a final node in the tree or the maximum expected value of all immediate children for the sub-tree below if the node is an intermediate node in the tree.

10. The system of claim 9, further comprising an analysis unit for performing extreme value analyses using security levels by substituting the value variables with security variables taking the numbers 0 or 1 indicating whether a value variable is below a threshold or not.

11. An automated method of making decision predictions in a decision situation, the method comprising:

receiving data corresponding to weights and/or probabilities and values for a decision situation that can be represented as a generalized decision tree with criteria and probabilistic events in the same tree;

modeling the decision situation using at least one of a probabilistic decision model or a multi-criteria decision making model, where at least one of the probabilistic decision model or the multi-criteria decision making model is modeled in more than one level for generation of a decision frame, where a decision frame is a format storing information on interval event probabilities, interval criteria weights, interval utility values, and decision trees;

evaluating the decision frame using input data fed through the input unit;

generating a decision prediction based on said decision frame evlution; and outputting the decision prediction.

12. The method of claim 11, wherein the same format is used for modeling a criteria hierarchy and a probabilistic decision tree.

13. The method of claim 11, wherein the decision situation is modeled with a combination of a probabilistic decision model and a multi-criteria decision making model and where the multi-criteria decision making model is modeled in more than one level.

14. The method of claim 11, further comprising the step of storing belief distributions in the decision frame and calculating the aggregated belief of a weighted expected value by means of a distribution of a sum of products, where the product of two belief distributions $f(x)$ and $g(x)$ is $$h(z) = \int_{\Gamma_z} f(x) \cdot g(y) ds,$$

where $\Gamma_z=\{(x,y):x \cdot y=z\}$ and $0 \leq z \leq 1$ and the sum of two belief distnbutions $f(x)$ and $g(x)$ is $$h(z) = \int_{\Gamma_z} f(x) \cdot g(y) ds,$$

where $\Gamma_z=\{z:z=x+y\}$ and $0 \leq z \leq 1$.

15. The method of claim 11, further comprising the step of checking consistency and determining the orthogonal hull as upper and lower bounds of the variables ($x_i$) in the decision frame, wherein the decision frame is found to be consistent if upper and lower bounds are found, wherein upper bounds ($max(x_i)$) and lower bounds ($min(x_i)$) are found simultaneously by solving the optimization problem max $\Sigma_i(x_i^+ - x_i^-)$ with a new constraint set formed from the decision frame, and wherein each variable $x_i$ is represented by the two variables $x_i^+$ and $x_i^-$, and the new constraint set is derived from the original in the decision frame by transforming, for an inequality operator ⋈, an inequality $x_i ⋈ k$ into a)$x_i^+ ⋈ k$ and b) $x_i^- ⋈ k$, an inequality $x_i - x_j ⋈ k$ into a)$x_i^+ - x_j^- ⋈ k$, and an equality $\Sigma_{i \in I}(x_i)=k$ into $\forall i \in I:$ a)$x_i^+ + \Sigma_{j \neq i}(x_j^-) \geq k$ and b)$\Sigma_{j \neq i}(x_j^-) \geq k$ and b) $\Sigma_{j \neq i}(x_j^+) - x_i^- \leq k$, whereby a solution vector to max $\Sigma_i(x_i^+ x_i^-)$ will contain the upper and lower bounds.

16. The method of claim 11, further comprising the step of performing a sensitivity analysis of the possible outcomes.

17. The method of claim 16, further comprising the step of storing belief distributions in the decision frame and where the measure for the analysis is $Len_\alpha f(x)=g(a,b)$ for a function g with the domain $Int_\alpha f(x)$, where $$Int_\alpha f(x) = \left\{(a,b): \int_a^b f(x)dx \geq \alpha\right\},$$

and where $\alpha \in [0.1]$ and $f(x)$ is a belief distribution.

18. The method of claim 11, further comprising the step of checking a critical value by instantiating a subset of the total of variables and varying the remaining variables.

19. The method of claim 11, further comprising the steps of:
- obtaining the upper and lower bounds of a weighted expected value of an alternative being the value of end nodes in the combined multi-criteria and probability tree multiplied with criteria weights and probabilities, a difference in weighted expected values between two alternatives, and a difference in weighted expected values between an alternative and the average of other alternatives in the decision frame,
- finding the maximum expected value function of each alternative under each criterion in the decision frame,
- calculating the desired weighted expected value function by a maximization of the weighted expected value functions of each alternative under each criterion,
- wherein the maximum expected value function of an alternative under a criterion is the function of the maximum expected value for the alternative under the criterion,
- wherein the maximum expected value of an alternative under a criterion in the decision frame is found by substituting the value variables with the upper value hull of the value variables and solving the resulting maximization problem for the root node of the tree, and
- wherein the maximum expected value of a node in the tree is found by obtaining the upper value hull of the value variable if the node is a final node in the tree or the maximum expected value of all immediate children for the sub-tree below if the node is an intermediate node in the tree.

20. The method of claim 19, further comprising the step of performing extreme value analyses using security levels by substituting the value variables with security variables taking the numbers 0 or 1 indicating whether a value variable is below a threshold or not.

21. A computer software program product embodied in a computer readable medium including computer instructions for making decision predictions in a decision situation that when executed on a computer provides for the following steps to be executed:
- receiving data corresponding to weights and/or probabilities and values for a decision situation that can be represented as a generalized decision tree with criteria and probabilistic events in the same tree;
- modeling the decision situation using at least one of a probabilistic decision model or a multi-criteria decision making model, where at least one of the probabilistic decision model or the multi-criteria decision making model is modeled in more than one level for generation of a decision frame, wherein a decision frame is a format storing information on interval event probabilities, interval criteria weights, interval utility values, and decision trees;
- evaluating the decision frame using input data fed through the input unit;
- generating a decision prediction based on said decision frame evaluation; and
- outputting the decision prediction.

22. The program product of claim 21, wherein the same format is used for modeling a criteria hierarchy and a probabilistic decision tree.

23. The program product of claim 21, wherein the decision situation is modeled with a combination of a probabilistic decision model and a multi-criteria decision making model and where the multi-criteria decision making model is modeled in more than one level.

24. The program product of claim 21, further providing for executing the step of storing belief distributions in the decision frame and calculating the aggregated belief of a weighted expected value by means of a distribution of a sum of products, where the product of two belief distributions $f(x)$ and $g(x)$ is $$h(z) = \int_{\Gamma_z} f(x) \cdot g(y) ds,$$

where $\Gamma_z = \{(x,y): x \cdot y = z\}$ and $0z\ 1$ and the sum of two belief distributions $f(x)$ and $g(x)$ is $$h(z) = \int_{\Gamma_z} f(x) \cdot g(y) ds,$$

where $\Gamma_z = \{z: z = x+y\}$ and $0 \leq z \leq 1$.

25. The program product of claim 21, further providing for executing the step of checking consistency and determining the orthogonal hull as the upper and lower bounds of the variables $(x_i)$ in the decision frame, wherein the decision frame is found to be consistent if upper and lower bounds are found and where upper bounds $(\max(x_i))$ and lower bounds $(\min(x_i))$ are found simultaneously by solving the optimization problem max $\Sigma_i(x_i^+ - x_i^-)$ new constraint set formed from the decision frame, and wherein each variable $x_i$ is represented by the two variables $x_i^+$ and $x_i^-$ and the new constraint set is derived from the original in the decision frame by transforming, for an inequality operator ⌑,
- an inequality $x_i$ ⌑ $k$ into a) $x_i^+$ ⌑ $k$ and b) $x_i^+$ ⌑ $k$,
- an inequality $x_i - x_j$ ⌑ $k$ into a) $x_i^+ - x_j^+$ ⌑ $k$ and b) $x_i^- - x_j^-$ ⌑ $k$, and
- an equality $\Sigma_{i \in I}(x_i) = k$ into $\forall i \in I$: a) $x_i^+ - \Sigma_{j \neq i}(x_j^-) \geq k$ and b) $\Sigma_{j \neq i}(x_j^+) - x_i^- \leq k$,
- whereby a solution vector to max $\Sigma_i(x_i^+ - x_i^-)$ contains the upper and lower bounds.

26. The program product of claim 21, further providing for executing the step of performing a sensitivity analysis of the possible outcomes.

27. The program product of claim 26, further providing for executing the step of storing belief distributions in the decision frame and where the measure for the analysis is $\text{Len}_{60}f(x) = g(a,b)$ for a function g with the domain $\text{Int}_\alpha f(x)$, where $$Int_\alpha f(x) = \left\{ (a, b): \int_a^b f(x) dx \geq \alpha \right\},$$

and where $\alpha \in [0,1]$ and $f(x)$ is a belief distribution.

28. The program product of claim 21, further providing for executing the step of checking a critical value by instantiating a subset of the total of variables and varying the remaining variables.

29. The program product of claim 28, further comprising the step of storing belief distributions in the decision frame and where the measure for the analysis is $\text{Len}_\alpha f(x) = g(a,b)$ for a function g with the domain $\text{Int}_\alpha f(x)$, where $$Int_\alpha f(x) = \left\{ (a, b): \int_a^b f(x)dx \geq \alpha \right\},$$

and where $\alpha \in [0,1]$ and $f(x)$ is a belief distribution.

30. The program product of claim 21, further providing for the steps of:
obtaining the upper and lower bounds of a weighted expected value of an alternative being the value of end nodes in the combined multi-criteria and probability tree multiplied with criteria weights and probabilities, a difference in weighted expected values between two alternatives, and a difference in weighted expected values between an alternative and the average of other alternatives in the decision frame,
finding the maximum expected value function of each alternative under each criterion in the decision frame,
calculating the desired weighted expected value function by a maximization of the weighted expected value functions of each alternative under each criterion,
wherein the maximum expected value function of an alternative under a criterion is the function of the maximum expected value for the alternative under the criterion,
wherein the maximum expected value of an alternative under a criterion in the decision frame is found by substituting the value variables with the upper value hull of the value variables and solving the resulting maximization problem for the root node of the tree, and
wherein the maximum expected value of a node in the tree is found by obtaining the upper value hull of the value variable if the node is a final node in the tree or the maximum expected value of all immediate children for the sub-tree below if the node is an intermediate node in the tree.

31. The program product of claim 21, further providing for executing the step of performing extreme value analyses using security levels by substituting the value variables with security variables taking the numbers 0 or 1 indicating whether a value variable is below a threshold or not.

* * * * *